(12) United States Patent
Tsuruoka

(10) Patent No.: US 8,437,289 B2
(45) Date of Patent: May 7, 2013

(54) COMMUNICATION APPARATUS, COMMUNICATION INTERFACE MODULE, AND COMMUNICATION METHOD

(75) Inventor: Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 12/711,228

(22) Filed: Feb. 23, 2010

(65) Prior Publication Data

US 2010/0215010 A1    Aug. 26, 2010

(30) Foreign Application Priority Data

Feb. 24, 2009    (JP) .................... 2009-040945

(51) Int. Cl.
*H04W 4/00*    (2009.01)
(52) U.S. Cl.
USPC ............ 370/328; 370/437; 370/468; 455/451
(58) Field of Classification Search .......... None
See application file for complete search history.

(56) References Cited

U.S. PATENT DOCUMENTS

| | | | | |
|---|---|---|---|---|
| 6,396,816 B1* | 5/2002 | Astle et al. | .................... | 370/264 |
| 2004/0057461 A1* | 3/2004 | Dawidowsky et al. | ....... | 370/468 |
| 2005/0190737 A1 | 9/2005 | Tanno | | |
| 2008/0004058 A1* | 1/2008 | Jeong et al. | .................... | 455/517 |

FOREIGN PATENT DOCUMENTS

| | | |
|---|---|---|
| JP | 2002-77300 | 3/2002 |
| JP | 2002-176425 | 6/2002 |
| JP | 2005-229272 | 8/2005 |

OTHER PUBLICATIONS

Part 16: Air Interface for Fixed Broadband Wireless Access Systems, *IEEE 802.16eTM-2005* Feb. 28, 2006.

Japanese Office Action mailed Feb. 5, 2013 for corresponding Japanese Application No. 2009-040945, with patrial English-Language translation.

* cited by examiner

*Primary Examiner* — Bob Phunkulh
(74) *Attorney, Agent, or Firm* — Fujitsu Patent Center

(57) ABSTRACT

A communication apparatus includes a controller configured to control transmission of a bandwidth request message, the transmission being triggered by a detection of connection establishment between the communication apparatus and a destination apparatus in a layer that is higher than a media-access control layer; and a transmitter configured to transmit the bandwidth request message in accordance with a control of the controller.

7 Claims, 19 Drawing Sheets

FIG.15

| APPLICATION TYPE | DESTINATION PORT (Destination port) | SOURCE PORT (Source port) | TIMING AT WHICH SIGNALING IS STARTED |
|---|---|---|---|
| HTTP | 80 | * | AFTER TRANSMISSION DATA IS RECEIVED |
| TELNET | 23 | * | AFTER TRANSMISSION DATA IS RECEIVED |
| FTP(FOR DATA TRANSFER) | * | 20 | BEFORE TRANSMISSION DATA IS RECEIVED |

* ARBITRARY VALUE

COMMUNICATION APPARATUS, COMMUNICATION INTERFACE MODULE, AND COMMUNICATION METHOD

CROSS-REFERENCE TO RELATED APPLICATIONS

This application is based upon and claims the benefit of priority of the prior Japanese Patent Application No. 2009-40945, filed on Feb. 24, 2009, the entire contents of which are incorporated herein by reference.

FIELD

The embodiments discussed herein are related to a communication apparatus, a communication interface, and a communication method.

BACKGROUND

One known scheme for transmitting and receiving data between communication apparatuses over a network is to, before communication apparatuses perform data transmission via a communication medium (wired/wireless), exchange control signals for reserving a data transmission bandwidth (signaling) between the communication apparatuses and an access controller configured to control access to the communication medium. Examples of schemes using such a transmission procedure include Mobile Worldwide Interoperability for Microwave Access (WiMAX), which is standardized by the Institute of Electrical and Electronics Engineers (IEEE) 802.16e.

FIG. 1 illustrates a signaling procedure for use in Mobile WiMAX, in particular, used in a best-effort service, which is performed after the establishment of a connection between communication apparatuses 100A and an access controller 110 configured to control access to a communication medium, such as another communication apparatus 100B. The communication apparatus 100A includes a processor 101 configured to execute an application or the like, and a communication interface 102. The processor 101 executes an application or the like to generate data, and passes transmission data to the communication interface 102 (at S1). Then, the communication interface 102 transmits a transmission request to the access controller 110 configured to control access to the communication medium (at S2) to request allocation of a bandwidth for transmitting a bandwidth request.

When a bandwidth for transmitting a bandwidth request is allocated by the access controller 110 (at S3), the communication interface 102 transmits a bandwidth request to notify the access controller 110 of a bandwidth necessary to transmit the data (at S4). When the bandwidth necessary to transmit the data is further allocated by the access controller 110 (at S31), the communication interface 102 transmits the data passed from the processor 101 to the communication apparatus 100B (at S5). In Mobile WiMAX, the above sequences have the following correspondences: S1 corresponds to transmission of ranging code, S4 corresponds to requesting a bandwidth using the signaling header, and S3 and S31 correspond to allocation of bandwidths using uplink map (UL-MAP) messages.

The signaling procedure illustrated in FIG. 1 requires times T1, T2, T21, T22, and T23. The time T1 is a waiting time for a frame period of a communication path between the communication interface 102 and the access controller 110. The time T2 is the time from when the access controller 110 processes the transmission request received in step S2 to when the access controller 110 allocates a request transmission slot to the communication apparatus 100A in step S3 in response to the transmission request. The time T21 is the time from receipt of bandwidth allocation in step S3 to transmission using the bandwidth allocated in step S3. The time T22 is the time from when the access controller 110 processes the bandwidth request received in step S4 to when the access controller 110 allocates a message transmission slot to the communication apparatus 100A in step S31 in response to the bandwidth request. The time T23 is the time from receipt of bandwidth allocation in step S31 to transmission using the bandwidth allocated in step S31. There arises a problem in that a delay time T3 including the times T1, T2, T21, T22, and T23 occurs for a period from when the communication interface 102 receives transmission data to when the communication interface 102 transmits the transmission data.

FIG. 2 illustrates an example of a signaling procedure used in a band-guaranteed service, which is performed after the establishment of a connection between communication apparatuses 100A/B and an access controller 110 configured to control access to a communication medium (e.g., communication apparatus 100B). With the use of a band-guaranteed service, a delay time T3 may be shorter than that in FIG. 1.

In the band-guaranteed service illustrated in FIG. 2, the access controller 110 periodically allocates a guaranteed amount of bandwidth (at S3). This may save the times T2 and T22 for the access controller 110 illustrated in FIG. 1 to perform processing, and may also reduce the delay time T3 from when the communication interface 102 of the communication apparatus 100A receives transmission data to when the communication interface 102 transmits the transmission data. However, in a case where the communication interface 102 does not have transmission data, the guaranteed amount of bandwidth is not used (at S6). Such wasteful bandwidth allocation reduces the use efficiency of entire network resources.

SUMMARY

In accordance with a certain aspect of invention, a communication apparatus includes a controller configured to control transmission of a bandwidth request message, the transmission being triggered by a detection of connection establishment between the communication apparatus and a destination apparatus in a layer that is higher than a media-access control layer, and a transmitter configured to transmit the bandwidth request message in accordance with a control of the controller. The controller controls the transmitter to transmit data that reaches the controller after establishment of a connection, using a bandwidth allocated in accordance with the transmitted bandwidth request message.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 illustrates examples of the application type and the port number.

DESCRIPTION OF EMBODIMENTS

Embodiments of the present invention will now be described with reference to the drawings.

Figure 1:
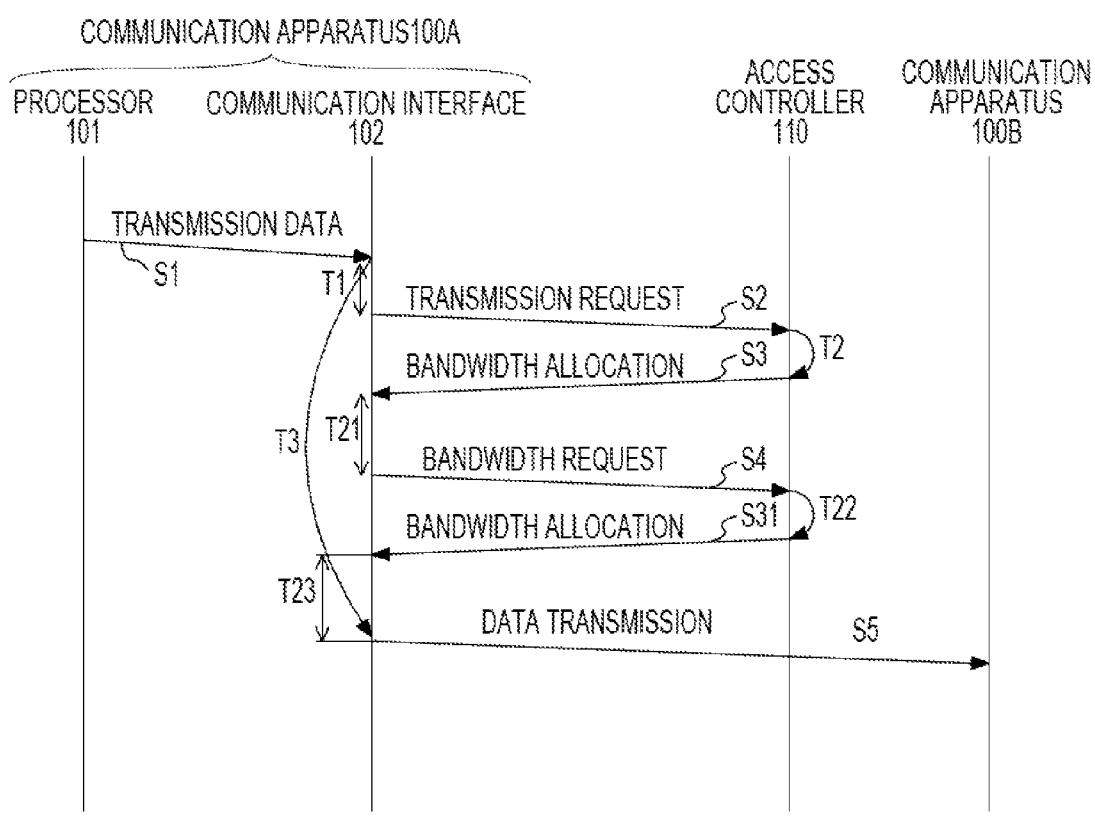
FIG. 1 illustrates an example of a signaling procedure used in a best-effort service, which is performed between a communication apparatus and an access controller after the establishment of a connection.
Figure 2:
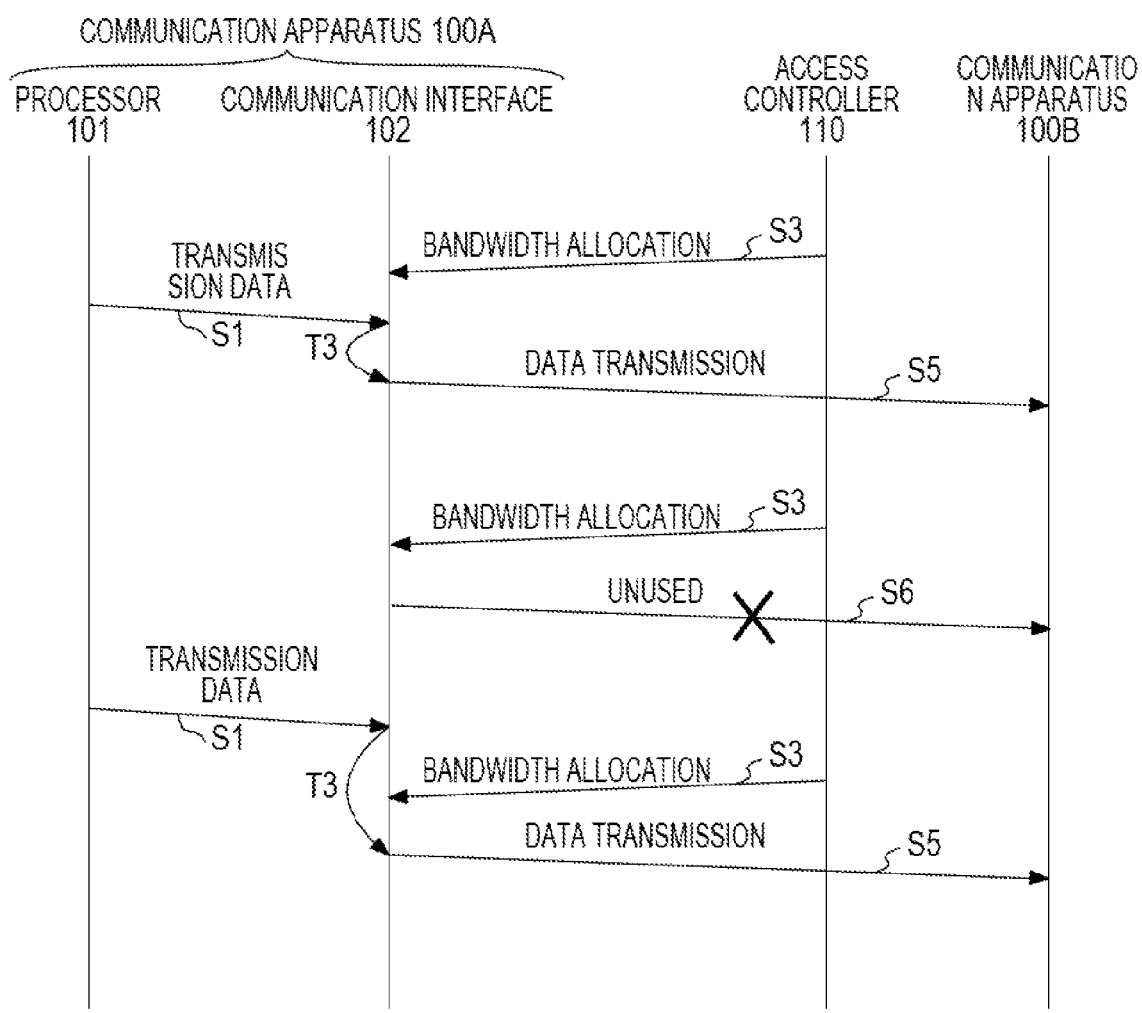
FIG. 2 illustrates an example of a signaling procedure used in a band-guaranteed service, which is performed between a communication apparatus and an access controller after the establishment of a connection.
Figure 3:
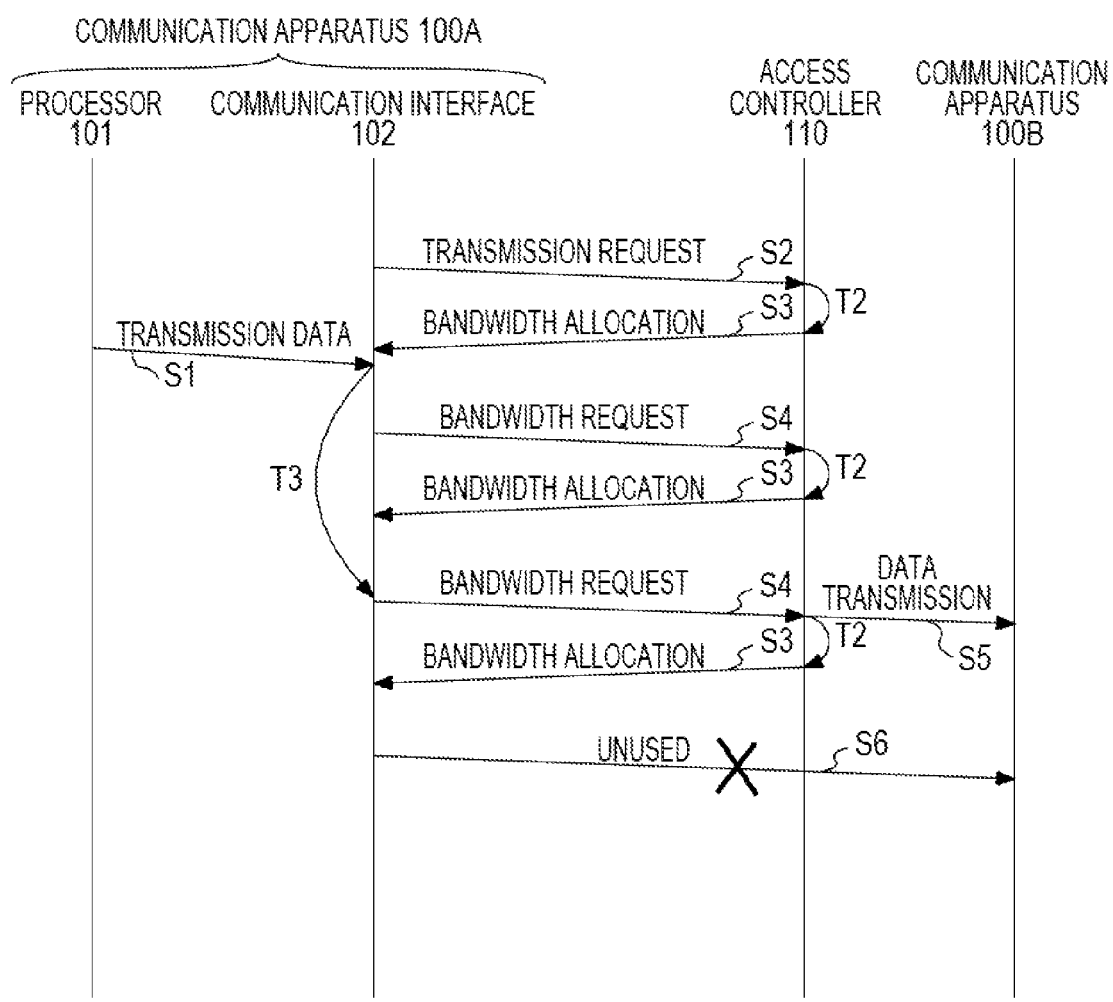
FIG. 3 illustrates an example of a signaling procedure with reduction in the time (T3) required for transmission illustrated in FIG. 1, which is performed between a communication apparatus and an access controller.

FIG. 3 illustrates an example of a signaling procedure used in a best-effort service, which is performed between communication apparatuses 100 and an access controller 110 configured to control access to a communication medium, in which the delay time T3 caused by transmission illustrated in FIG. 1 is reduced. In the illustrated example, a communication interface 102 periodically transmits a bandwidth request (at S4) to reduce the delay time T3 from when transmission data is received to when the transmission data is transmitted. However, since the potential arrival of transmission data is not taken into consideration, if the communication interface 102 has not received transmission data by the time of bandwidth allocation in step S3, the allocated bandwidth is not used (at S6). Such wasteful bandwidth allocation reduces the use efficiency of network resources.

First Embodiment

Figure 4:
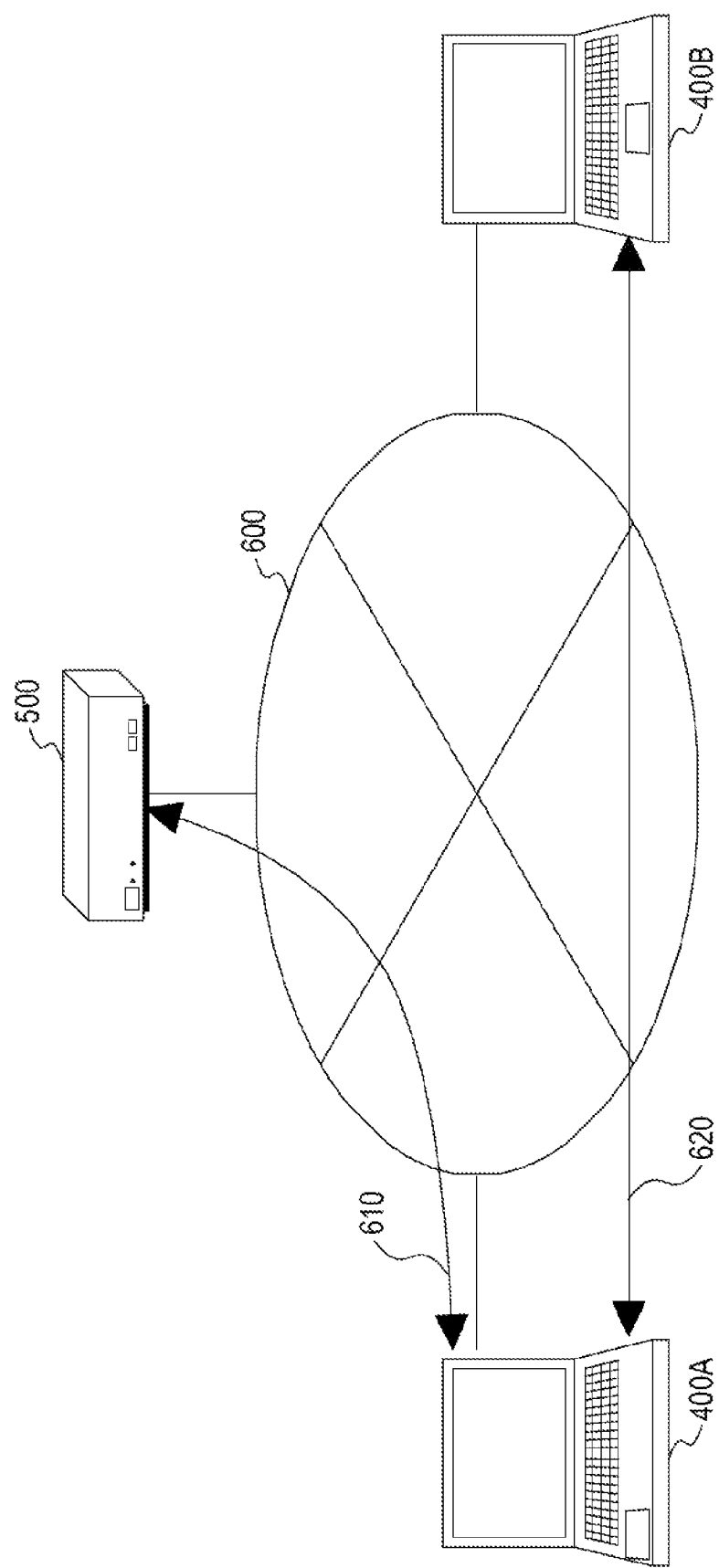
FIG. 4 illustrates an example configuration of a communication system according to an embodiment.

FIG. 4 illustrates an example configuration of a communication system. In the communication system illustrated in FIG. 4, communication apparatuses 400A and 400B and an access controller 500 are connected to one another via a network 600. Each of the communication apparatuses 400A and 400B is, for example, a workstation, a personal computer, a mobile phone terminal, or any other information terminal, and is connected to the network 600 via a wired or wireless transmission medium. The access controller 500 is configured to allocate a bandwidth available for the communication apparatuses 400A and 400B and the like and to control (610) access to a communication medium. The access controller 500 may be provided inside a wireless base station, and may perform wireless communication with the communication apparatus 400A (in this case, a wireless terminal) to allow the communication apparatus 400A to wirelessly access the communication medium. The communication apparatuses 400A and 400B transmit and receive (620) data to and from each other using the allocated bandwidth (wired bandwidth/wireless bandwidth).

Figure 5:
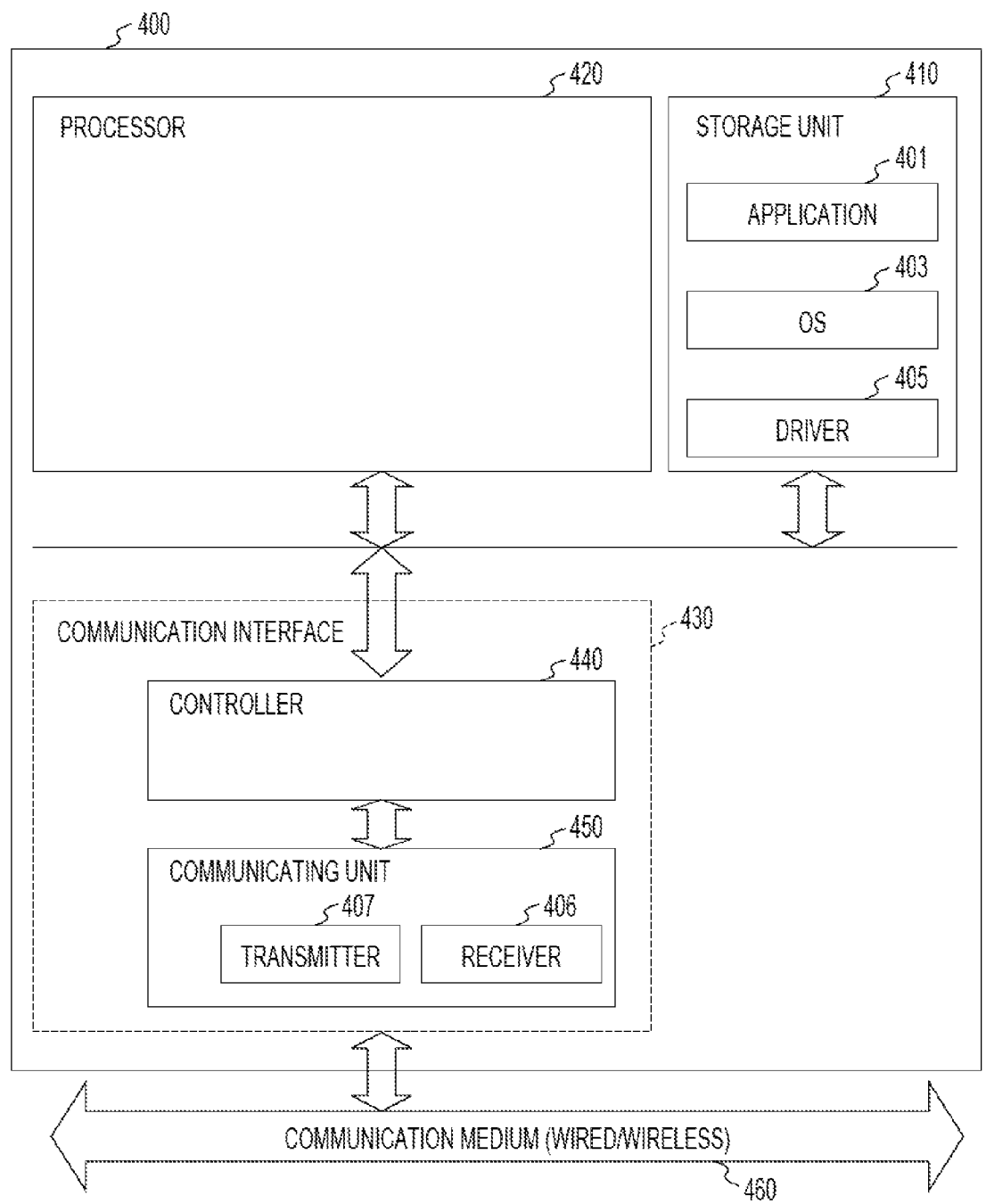
FIG. 5 illustrates an example configuration of a communication apparatus according to an embodiment.

FIG. 5 illustrates an example configuration of a communication apparatus 400 (e.g., the communication apparatus 400A or 400B) according to a first embodiment. The communication apparatus 400 includes a storage unit, such as memory, 410 configured to store various software items, and a processor 420 configured to perform processing on the basis of a software item stored in the storage unit 410.

Examples of software items stored in the storage unit 410 may include, for example, a driver 405 configured to determine a control procedure for sending data to or from a controller 440, an operating system (OS) 403, and an application 401. The OS 403 is configured to perform processing regarding a protocol above the media access control (MAC) layer. The processing performed by the OS 403 may include processes based on Transport Control Protocol/Internet Protocol (TCP/IP) or the like (processes in a layer higher than the MAC layer).

The processor 420 sends data generated by executing the application 401 or the like to the controller 440 using the driver 405, and obtains data from the controller 440 so that the data may be used to execute the application 401. The communication interface 430 may also be a device that is detachably attached to a processing apparatus including the processor 420, the storage unit 410, and any other suitable device.

The communication interface 430 includes a controller 440 configured to perform processing mainly in the MAC layer, and a communicating unit 450. When transmission data is obtained from the processor 420, the controller 440 controls the communicating unit 450 to transmit the data via a communication medium 460. Data transmitted via the communication medium 460 is received by the communicating unit 450, and is subjected to reception processing by the receiver 406. Then, the resulting data is supplied to the controller 440, and is transferred to the processor 420.

Examples of the communication medium 460 include wired and wireless communication media. The communicating unit 450 may be provided with a communicating unit that supports the communication medium 460. The communicating unit 450 may also be provided with both a communicating unit that supports wired transmission and a communicating unit that supports wireless transmission.

When the communication medium 460 is a wireless communication medium, a transmitter 407 converts the transmission data into a wireless signal (into a signal within the allocated bandwidth) and then sends the resulting signal to the communication medium 460. The receiver 406 demodulates a received wireless signal and then converts the demodulated wireless signal into a data signal so as to produce data that may be processed by the processor 420 (when the transmission data has been segmented into data segments, the data segments are combined to reproduce the original data before segmentation) before sending the received data to the processor 420.

The controller 440 of the communication interface 430 has a signaling function for generating and analyzing a signaling message, and a connection detecting function for detecting connection establishment using a protocol above the MAC layer.

Figure 6:
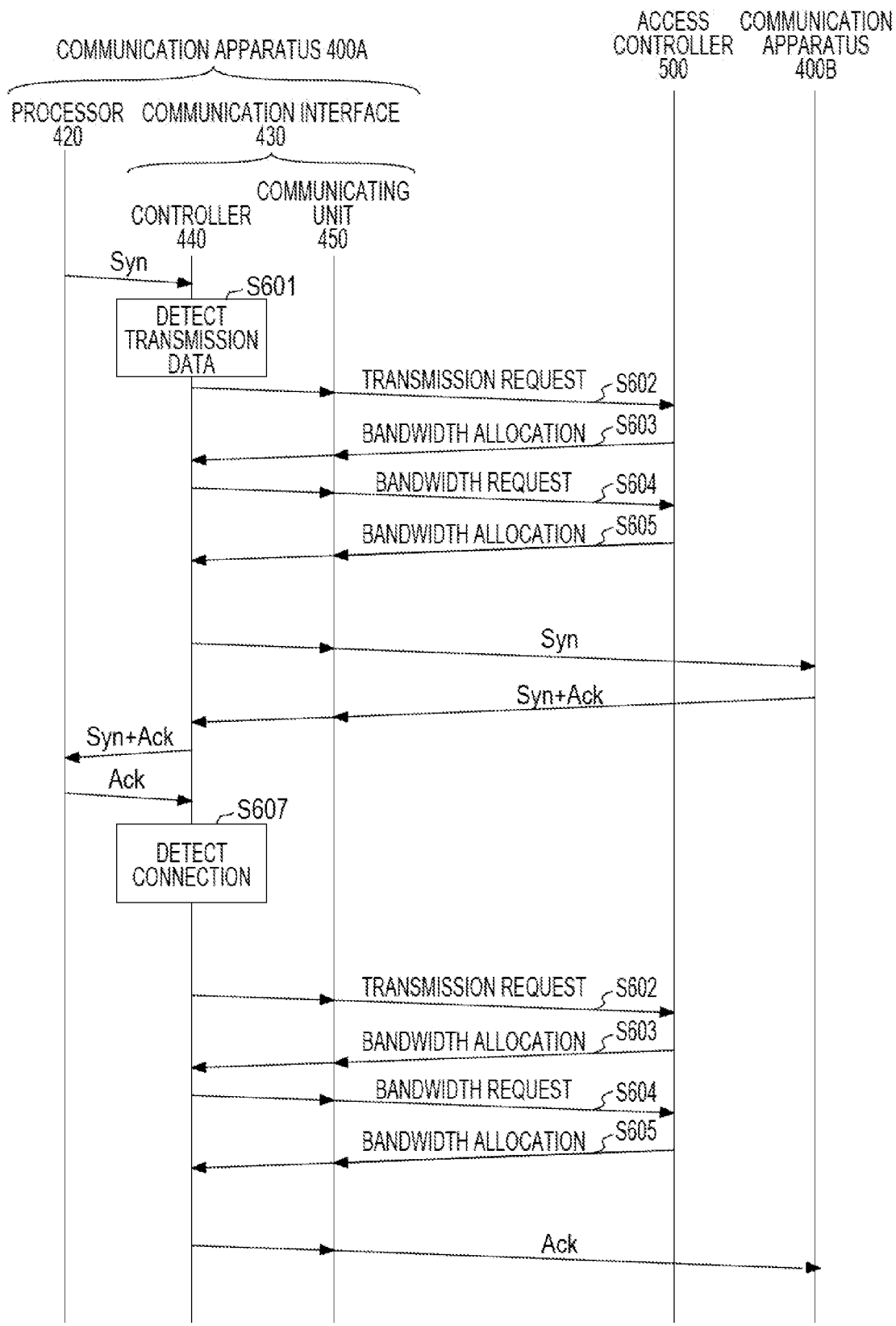
FIG. 6 illustrates an example of a signaling procedure performed until the establishment of a connection.

Next, an example of a signaling procedure performed until a connection has been established will be described with reference to FIG. 6. In FIG. 6, for ease of illustration, it is assumed that the communicating unit 450 includes the receiver 406 and the transmitter 407.

In a state where no connection has been established using an upper layer protocol, first, the processor 420 of the communication apparatus 400A transmits a connection request Syn to the transmitter 407 of the communicating unit 450 in accordance with the processing based on the upper layer protocol using the application 401 or the OS 403. The controller 440 detects the scheduled transmission of the connection request Syn (at S601), and transmits and receives signaling messages to and from the access controller 500. Specifically, the controller 440 transmits a transmission request (at S602), receives bandwidth allocation transmitted from the access controller 500 in response to the transmission request (at S603), and transmits a bandwidth request (at S604) for requesting allocation of a bandwidth to transmit the connection request Syn using the bandwidth allocated at S603. Then, the controller 440 receives allocation (at S605) of a bandwidth necessary to transmit the connection request Syn on the basis of the bandwidth allocation received from the access controller 500.

Therefore, the controller 440 causes the transmitter 407 to transmit the connection request Syn using the allocated bandwidth. The transmitter 407 transmits the connection request Syn to the communication apparatus 400B. Bandwidth allocation is performed by, for example, specifying wireless resources (such as time and frequency) when the communication medium 460 is a wireless communication medium.

Then, the receiver 406 of the communicating unit 450 receives a response Syn+Ack to the connection request Syn from the communication apparatus 400B. The controller 440 passes the response Syn+Ack received by the receiver 406 to the processor 420. Since the response Ack has been acknowledged, the processor 420 passes the response Ack to the controller 440 to notify the communication apparatus 400B of the response Syn+Ack having been correctly received. Upon receipt of the response Ack, the controller 440 performs processing similar to the processing at S602 to S605 described above (where a bandwidth available for transmitting the response Ack is be allocated), and transmits the response Ack to the communication apparatus 400B using the allocated bandwidth.

The flow up to the establishment of a connection has been described. In this embodiment, the controller 440 monitors packets to be processed in accordance with an upper layer protocol, which are received from the processor 420 or received from the communication apparatus 400B serving as a communication counterpart. The monitoring of packets facilitates detection of highly possible later data transmission. The establishment of a connection may be an exemplary object to be monitored. Detection of the establishment of a connection includes detection of the actual establishment of a connection and detection of the scheduled establishment of a connection (detection of predicted establishment).

Therefore, the establishment of a connection may also be detected (step S607) by, for example, as illustrated in FIG. 6, sending the response Ack from the processor 420 to the controller 440. The response Ack may be easily detected by detecting a packet in which an ACK flag is set.

In TCP-based communication, the establishment of a connection may also be detected by detecting a packet (Syn) in which a SYN flag is set in the TCP header. The detection based on an Ack signal allows more reliable prediction of data transmission. In some cases, the response Syn+Ack may not be sent and no connection may be established.

A connection may also be established using a connection request and a response Syn+Ack thereto. The response Syn+Ack may be detected by detecting a packet in which both a SYN flag and an ACK flag are set. Preferably, the detection of a connection is performed using the Ack signal because no response Ack may be returned from the processor 420 in response to the response Syn+Ack. In order to increase reliability, the actual transmission of a response Ack may be detected to detect the establishment of a connection.

In a case where a plurality of connections has been simultaneously established, the establishment of each of the connections is individually detected.

The termination of a connection may be detected by detecting a packet in which a FIN flag is set in the TCP header.

While FIG. 6 illustrates the process performed in a case where the establishment of a connection is initiated by the communication apparatus 400A, the establishment of a connection may be performed by sending a connection request from the communication counterpart (for example, the communication apparatus 400B). In a case where a connection request is sent from the communication counterpart, a connection request Syn, a response Ack, and a response Syn+Ack thereto are transmitted and received in directions opposite to those in FIG. 6. However, packets transmitted and received in the manner similar to those in the example illustrated in FIG. 6 may be monitored to detect session establishment. Known techniques for detecting the establishment and termination of a connection in a TCP session include "Connection Tracking" and "Stateful Inspection", which are techniques for monitoring the state of each TCP session. The actual establishment of a connection may be detected using any other technique.

A process performed after the establishment of a connection has been detected in the manner described above will now be described with reference to FIG. 7.

Figure 7:
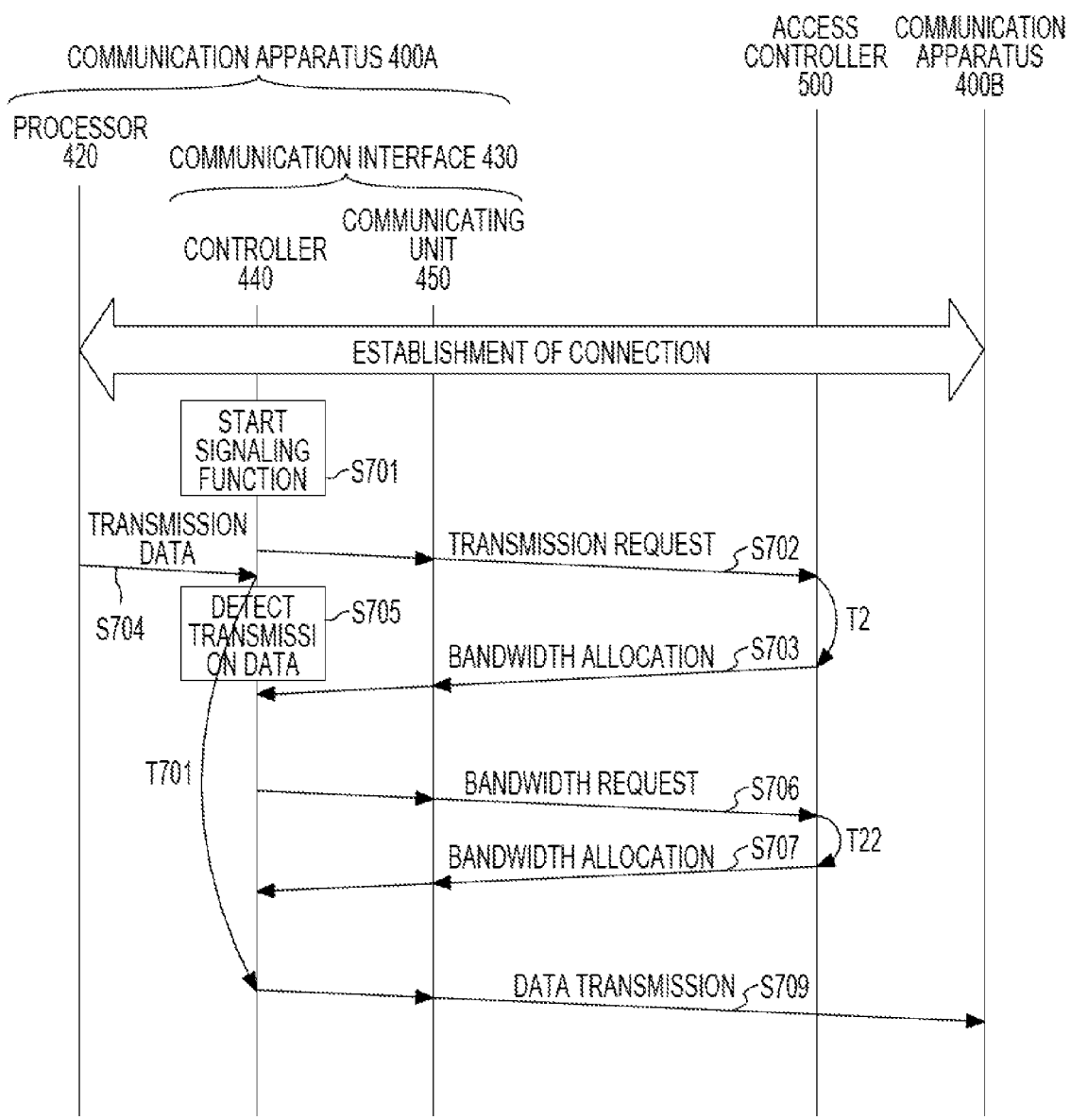
FIG. 7 illustrates an example of a signaling procedure according to a first embodiment, which is performed between a communication apparatus and an access controller after the process illustrated in FIG. 6 has been performed.

FIG. 7 illustrates an example of a signaling procedure performed between the communication apparatuses 400 and the access controller 500 after the process illustrated in FIG. 6 has been performed.

The controller 440 of the communication interface 430 detects, for example, a response ACK at S607 in FIG. 6. As described previously, the establishment of communication in a layer higher than the MAC layer may be detected by transmitting the response ACK. The establishment of communication in a layer higher than the MAC layer represents high possibility of further data transmission.

Thus, when the establishment of a connection is detected, the controller 440 of the communication apparatus 400A sends a transmission request. The transmission request may be sent without requiring that transmission data have been actually sent from the processor 420 to the controller 440.

That is, when the establishment of a connection is detected, the controller 44 starts the signaling function of the controller 440 (at S701). The controller 440 generates a signaling message (one of bandwidth request messages) by using the signaling function regardless of whether transmission data has been received from the processor 420 or the controller 440 has no transmission data, and causes the transmitter 407 to transmit the signaling message (at S702). In other words, transmission of the signaling message (bandwidth request message) is triggered by the detection of the establishment between the communication apparatus 400A and a destination apparatus 400B in a layer that is higher than a media-access control layer. In response to this request, a bandwidth is allocated (at S703). In this manner, the process for reserving a bandwidth for a communication medium is started in accordance with detection of the establishment of communication in a layer higher than the MAC layer, resulting in the feasibility of earlier data transmission.

As described above, the communication interface 430 performs the process for reserving a bandwidth. On the other hand, the processor 420 executes the application 401 or the like, which has triggered the process of establishing a connection, to generate transmission data, and sends the transmission data to the controller 440 (at S704). Therefore, the controller 440 detects the actual arrival of the transmission data (at S705), and exerts the signaling function to transmit a bandwidth request for requesting allocation of a transmission bandwidth for the amount of data using the allocated bandwidth (at S706).

In a case where the number of times the bandwidth allocated by bandwidth allocation received at S703 is used is limited to one (a predetermined timing), preferably, transmission timings such as the timings at S701 and S702 are adjusted. For example, the processing at S701 may be executed after a predetermined time has elapsed since the establishment of a connection, and a bandwidth request message corresponding to the amount of the transmission data obtained at S704 may be transmitted using the bandwidth allocated at S703.

The process up to S706 or S707 may also be performed. Specifically, a bandwidth request may be sent at S706 (the allocation of a predetermined amount of bandwidth is requested) irrespective of the amount of data obtained at S704, and only a data portion of the transmission data obtained at S704, which may be transmitted using the bandwidth allocated at S707, may be transmitted. When the bandwidth allocated at S707 may carry all transmission data, all the transmission data obtained at S704 may be transmitted.

Even when only the processing at S702 is executed until transmission data is obtained at S704, actual transmission of the transmission data may be performed earlier than that when the processing at S702 is executed after transmission data is received at S704.

Upon receipt of bandwidth allocation from the access controller 500 (at S707), the controller 440 causes the transmitter 407 to transmit data generated by executing the application 401 or the like to the communication apparatus 404B. The transmitter 407 transmits the data to the communication apparatus 400B in accordance with the instruction from the controller 440 (at S709). Subsequently, for a period of time during which the controller 440 is detecting a connection, the signaling function of the controller 440 repeats the operation of transmitting a transmission request to the access controller 500 even when transmission data is not ready to be transmitted.

According to the first embodiment, since the communication apparatus 400A starts signaling with the access controller 500 after the establishment of a connection, a delay time from when transmission data is obtained from the processor 420 to when the transmission data is transmitted after the establishment of the connection may be reduced. For example, a delay time T701 illustrated in FIG. 7 may be shorter than the delay time T3 illustrated in FIG. 1 by the amount of time T2+T21 involved in reservation of synchronization.

Second Embodiment

The example configuration of the communication system illustrated in FIG. 4 and the example configuration of the communication apparatus 400 illustrated in FIG. 5 are also applied to a second embodiment.

Figure 8:
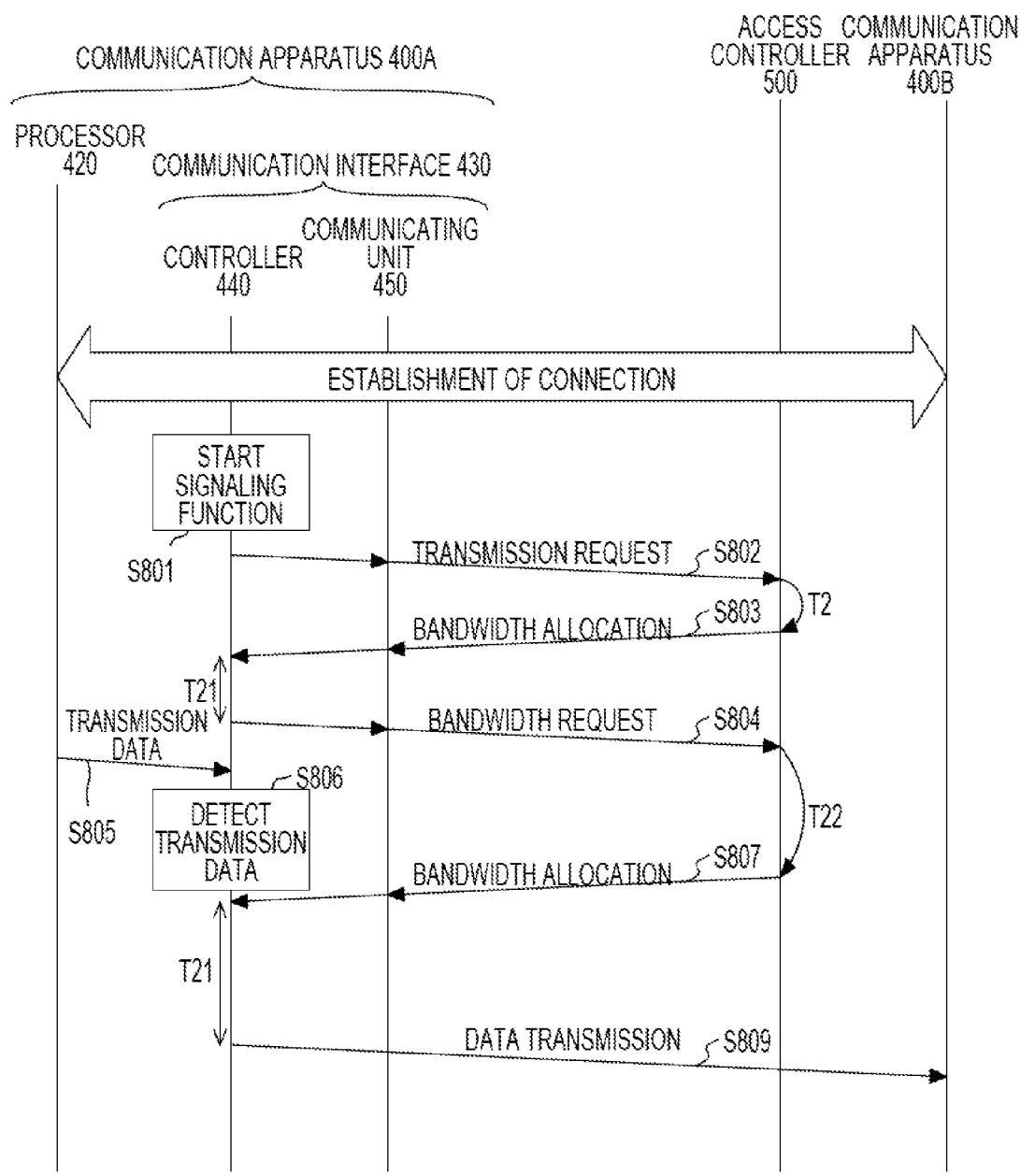
FIG. 8 illustrates an example of a signaling procedure according to a second embodiment, which is performed between a communication apparatus and an access controller.

FIG. 8 illustrates an example of a signaling procedure according to the second embodiment, which is performed between the communication apparatuses 400 and the access controller 500. S801 to S809 illustrated in FIG. 8 are similar to S701 to S709 illustrated in FIG. 7, respectively. The sequence illustrated in FIG. 8 is different from that in FIG. 7 in that the controller 440 transmits a bandwidth request to the access controller 500 (at S804) and then obtains transmission data from an application 401 (at S805). In FIG. 8, the controller 440 sends a bandwidth request to request allocation of a minimum amount of bandwidth or a predetermined amount of bandwidth (at S804). For example, in a case where TCP is employed, the allocation of a minimum amount of bandwidth required to transmit an Ack packet is requested.

This allows transmission of a bandwidth request (at S804) even when the processor 420 passes data generated by executing the application 401 or the like to the controller 440 after the timing of bandwidth allocation at S803. In this case, as far as the amount of the transmission data obtained by the controller 440 at S805 is within the amount of the allocated bandwidth designated in bandwidth allocation returned at S807 in response to the bandwidth request sent in step S804, the transmission data is allowed to be transmitted with a minimum transmission waiting time (at S809). If all the data obtained by the controller 440 at S805 is not allowed to be transmitted with the amount of allocated bandwidth designated in bandwidth allocation at S807, the controller 440 may transmit a request for a required amount of bandwidth and an additional amount of bandwidth in step S809. Additionally, even when the controller 440 does not have transmission data by the time of receipt of bandwidth allocation (at S807), unnecessary consumption of bandwidth may be minimized.

Third Embodiment

The example configuration of the communication system illustrated in FIG. 4 and the example configuration of the communication apparatus 400 illustrated in FIG. 5 are also applied to a third embodiment.

Figure 9:
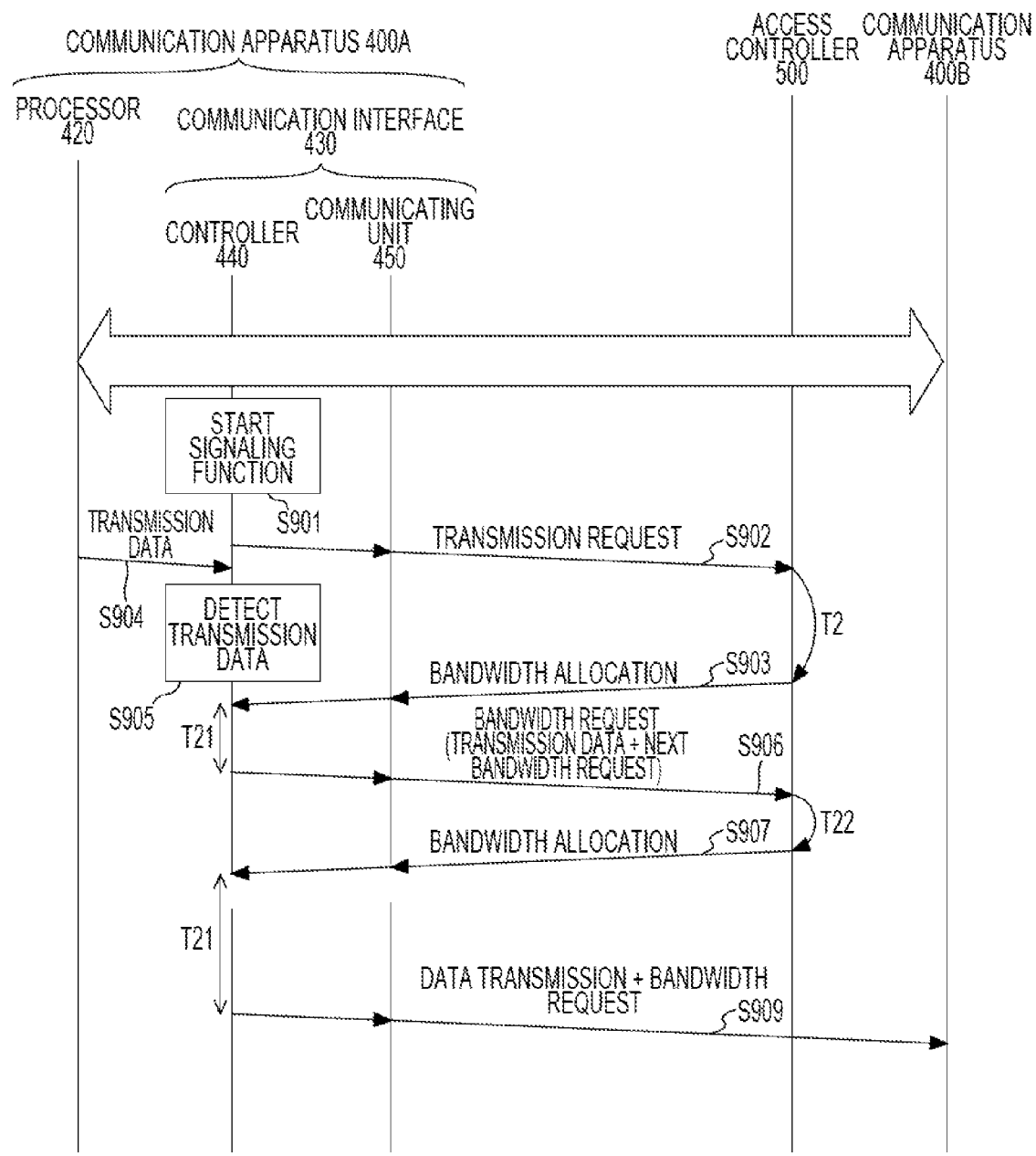
FIG. 9 illustrates an example of a signaling procedure according to a third embodiment, which is performed between a communication apparatus and an access controller.

FIG. 9 illustrates an example of a signaling procedure according to the third embodiment, which is performed between the communication apparatuses 400 and the access controller 500. S901 to S909 in FIG. 9 are similar to S701 to S709 in FIG. 7, respectively. the sequence illustrated in FIG. 9 is different from that in FIG. 7 in that, instead of transmitting a bandwidth request (at S706) for the amount of transmission data obtained at S704, the controller 440 transmits a request for an amount of bandwidth required to transmit the transmission data and a next bandwidth request to the access controller 500 (at S906). The controller 440 requests the access controller 500 (at S906) to allocate a total bandwidth including a bandwidth required for the processor 420 to transmit data generated by executing the application 401 or the like and a bandwidth required to transmit a next bandwidth request.

This allows the controller 440 to transmit a next bandwidth request together with transmission data so that the transmission of a transmission request required for the next bandwidth request (at S702) may be omitted. Therefore, the communication apparatus 400A may efficiently execute signaling with the access controller 500, and may reduce the time required for the next data transmission.

Fourth Embodiment

The example configuration of the communication system illustrated in FIG. 4 and the example configuration of the communication apparatus 400 illustrated in FIG. 5 are also applied to a fourth embodiment.

Figure 10:
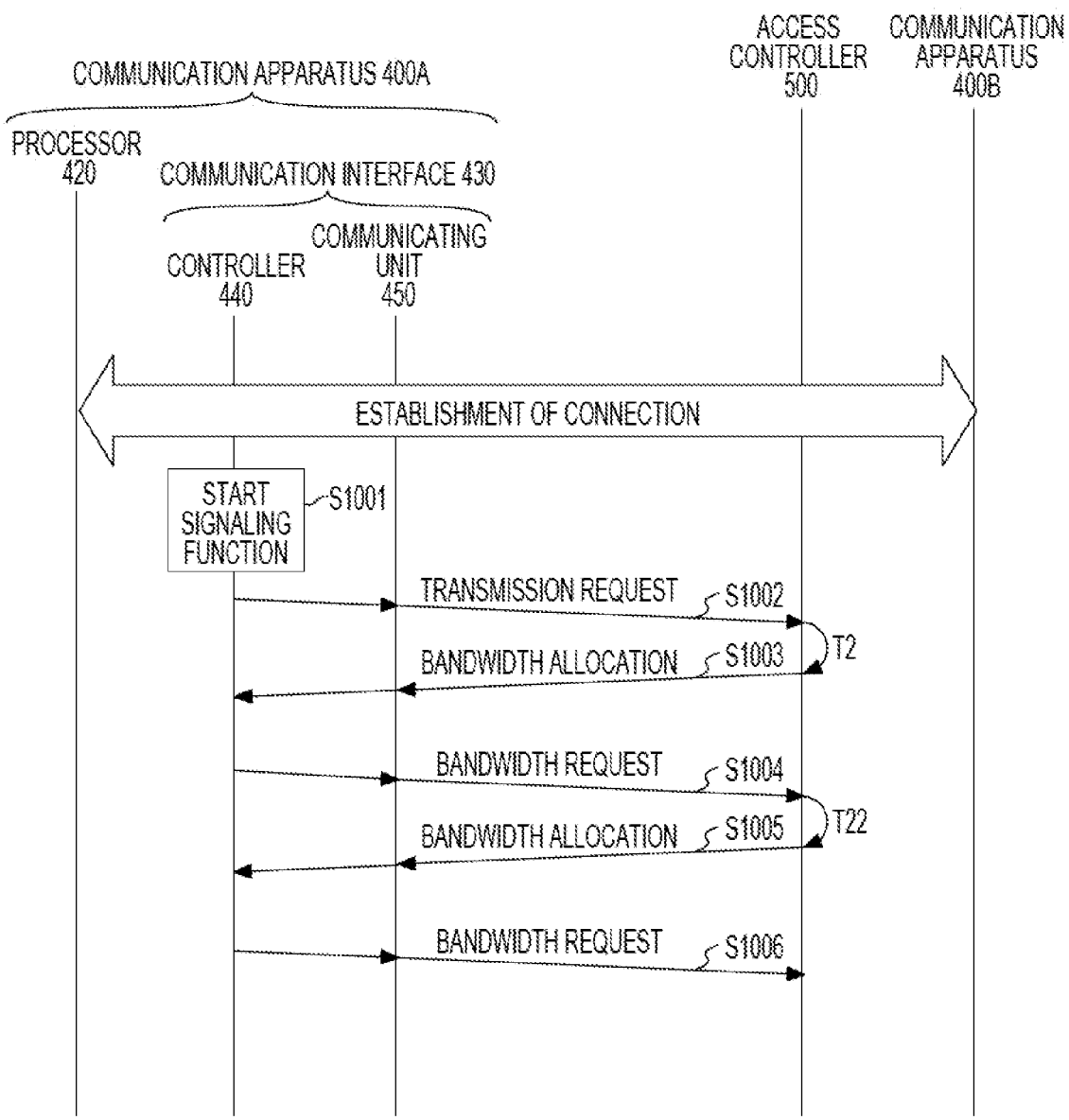
FIG. 10 illustrates an example of a signaling procedure according to a fourth embodiment, which is performed between a communication apparatus and an access controller.

FIG. 10 illustrates an example of a signaling procedure according to the fourth embodiment, which is performed between the communication apparatuses 400 and the access controller 500. S1001 to S1006 illustrated in FIG. 10 are similar to S801 to S804, S807, and S809 illustrated in FIG. 8, respectively. The sequence illustrated in FIG. 10 is different from that in FIG. 8 in that the controller 440 has not obtained transmission data from the processor 420 at the time of receipt of bandwidth allocation (at S1003) in response to a bandwidth request from the access controller 500. The controller 440 transmits a bandwidth request to the access controller 500 using the bandwidth allocated at S1003 (at S1004) even when the controller 440 has no transmission data. This ensures that the bandwidth may continuously be allocated by the access controller 500. In this case, as at S804 in the second embodiment, the allocation of a minimum amount of bandwidth or a predetermined amount of bandwidth may be requested.

This allows efficient use of at least a portion of the allocated bandwidth even when the controller 440 has no transmission data using the application 401. Additionally, since the controller 440 is allowed to continue signaling with the access controller 500, the occurrence of re-signaling may be avoided and the time required for the next data transmission may be reduced.

Fifth Embodiment

The example configuration of the communication system illustrated in FIG. 4 and the example configuration of the communication apparatus 400 illustrated in FIG. 5 are also applied to a fifth embodiment.

In the fifth embodiment, the controller 440 illustrated in FIG. 5 is configured to further detect the length of a packet to be transmitted from the transmitter 407. For example, the controller 440 may detect the length of an immediately preceding packet transmitted from the transmitter 407.

Alternatively, the controller 440 may take statistics of the frequency of transmission for each length of packet transmitted from the transmitter 407 and may detect the length of the mostly frequently transmitted packet. As an alternative, the controller 440 may detect the length of an immediately preceding packet or the length of a frequently transmitted packet for each connection established. The controller 440 may also set an upper limit of packet length so as to suppress unnecessary consumption of network resources, which may be caused by bandwidth allocation required based on the packet length when no transmission data is obtained as described below.

Figure 11:
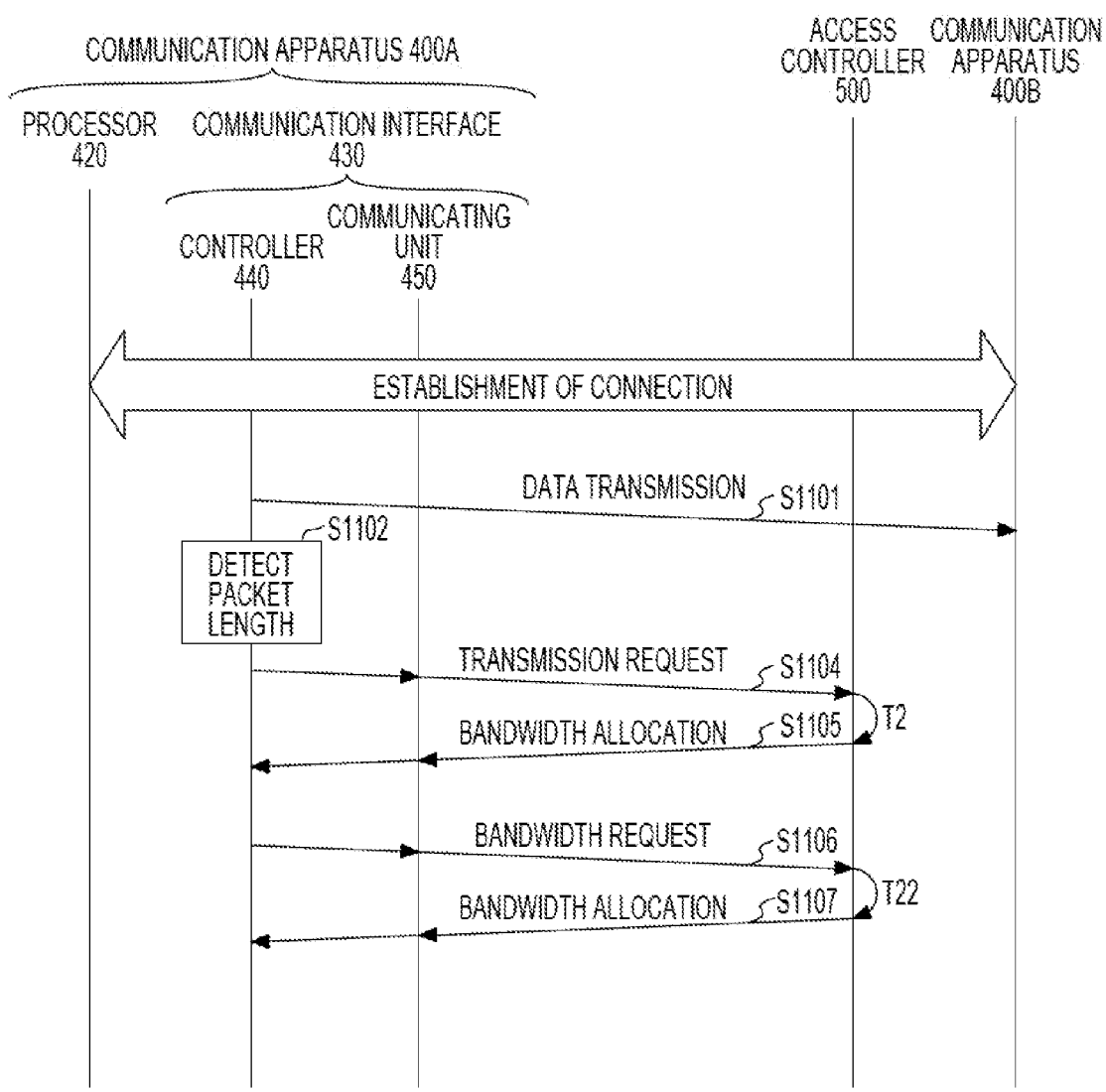
FIG. 11 illustrates an example of a signaling procedure according to a fifth embodiment, which is performed between a communication apparatus and an access controller.

FIG. 11 illustrates an example of a signaling procedure according to the fifth embodiment, which is performed between the communication apparatuses 400 and the access controller 500. The sequence illustrated in FIG. 11 is different from the sequences illustrated in FIGS. 7 to 10 in that the controller 440 is configured to detect the packet length and send a notification. After data is transmitted according to any of the first to fourth embodiments described above (at S1101), the controller 440 detects a packet length in the manner described above (at S1102).

When the controller 440 has not received transmission data from the processor 420 by the time of transmission (at S1106) of a bandwidth request, the controller 440 requests the access controller 500 to allocate a bandwidth required to transmit the detected packet length (at S1106).

Therefore, even when the controller 440 has not received transmission data from the processor 420 at the time of a bandwidth request in step S1106, if transmission data is obtained by the time of receipt of bandwidth allocation at S1107, the transmission data may possibly be transmitted using the bandwidth allocated at S1107, and the time from when the controller 440 obtains the transmission data to when the controller 440 actually transmits the transmission data may be reduced. When the controller 440 has not received transmission data from the processor 420 at the time of receipt of bandwidth allocation at S1107, as described in the fourth embodiment, the controller 440 transmits bandwidth allocation only for the next transmission, thereby allowing efficient use of at least a portion of the allocated bandwidth.

Sixth Embodiment

The example configuration of the communication system illustrated in FIG. 4 and the example configuration of the communication apparatus 400 illustrated in FIG. 5 are also applied to a sixth embodiment.

According to the sixth embodiment, the controller 440 illustrated in FIG. 5 measures a first response time from when a transmission request is transmitted to when bandwidth allocation is received. The controller 440 adjusts, depending upon the measured first response, the timing at which a transmission request or a bandwidth request is to be transmitted. The sixth embodiment may be combined with any of the first to fifth embodiments described above.

Figure 12:
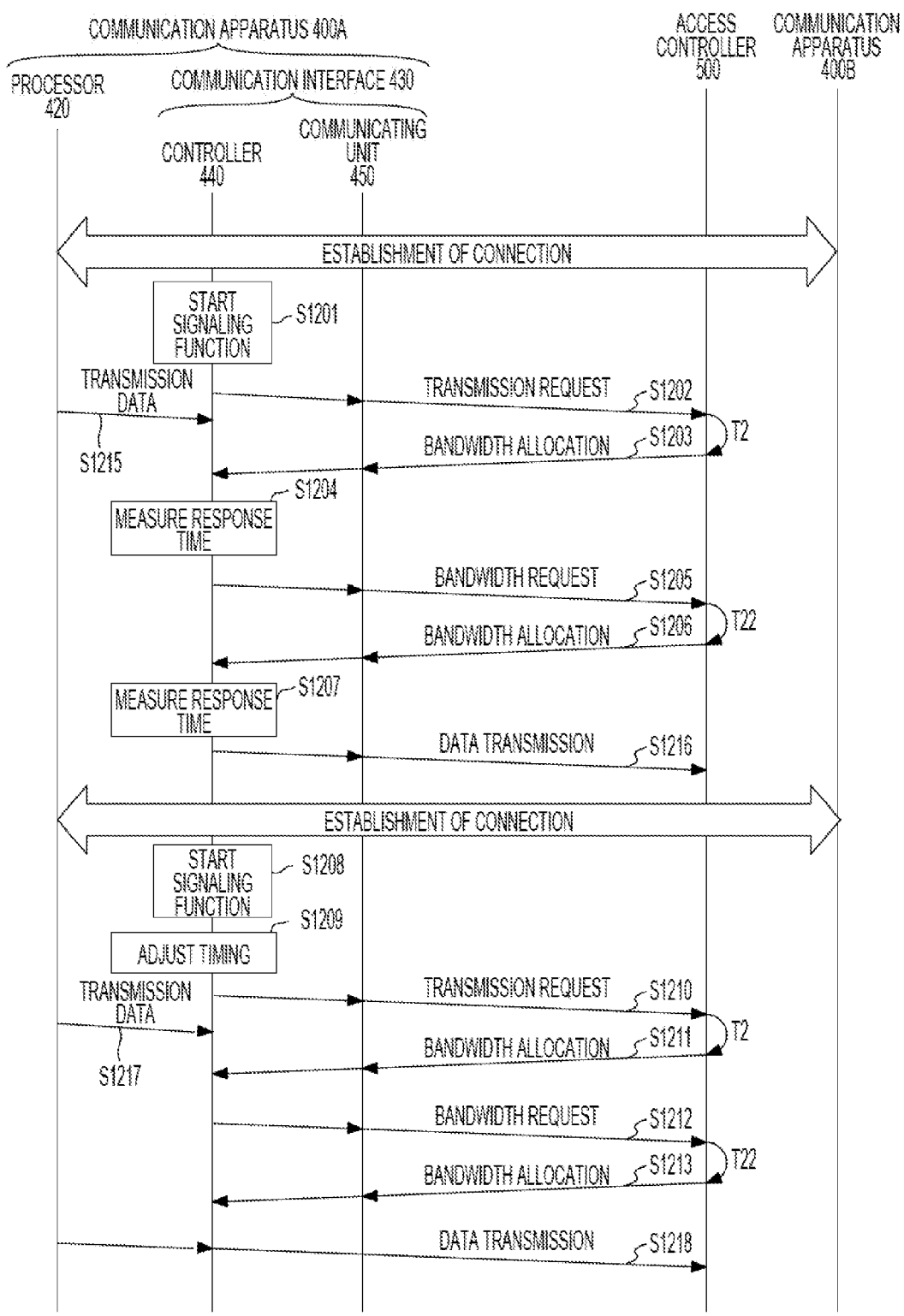
FIG. 12 illustrates an example of a signaling procedure according to a sixth embodiment, which is performed between a communication apparatus and an access controller.

FIG. 12 illustrates an example of a signaling procedure according to the sixth embodiment, which is performed between the communication apparatuses 400 and the access controller 500. S1201 to S1203, S1205, S1206, S1208, and S1210 to S1218 illustrated in FIG. 12 are similar to S701 to S703, S704, S706, S707, and S709 illustrated in FIG. 7. The sequence illustrated in FIG. 12 is different from the sequences illustrated in FIGS. 7 to 11 in that the controller 440 measures a response time and adjusts the timing at which a request is to be transmitted.

As described above, the controller 440 measures a response time of the access controller 500 (at S1204 and S1207). When the sum of a response time from when a transmission request is transmitted (at S1202) to when bandwidth allocation is received (at S1203) and a response time from when a bandwidth request is transmitted (at S1205) to when bandwidth allocation is received (at S1206) is longer than a predetermined value, the controller 440 advances the transmission of a subsequent transmission request (at S1210), which is performed before transmission data is obtained, with respect to the predetermined time (at S1209). When the sum of the response times is shorter than the predetermined value, conversely, the controller 440 delays the transmission of a transmission request (at S1210) with respect to the predetermined time (at S1209). The amount of advance or delay with respect to the predetermined time may be based on the difference between the sum of the response times and the predetermined value or may be multiplied by a coefficient or undergo any other processing for adjustment.

Therefore, the controller 440 may transmit a transmission request at an appropriate timing in accordance with the response time of the access controller 500.

In the procedure described above, furthermore, the controller 440 controls the timing at which a transmission request is to be transmitted (at S1210). In another example, the controller 440 may determine whether or not to send an additional bandwidth request at S906 according to the third embodiment on the basis of the response time from when a bandwidth request is transmitted (at S1205) to when bandwidth allocation is received (at S1206).

The timing may be adjusted by adjusting the time from the immediately preceding data transmission to the subsequent transmission of a transmission request or a bandwidth request.

Furthermore, the controller 440 may perform the processing of both S1204 and S1207 to measure individual response times, or may perform the processing of either S1204 or S1207 to measure a response time in a system in which the difference between the response times is small.

Seventh Embodiment

Figure 13:
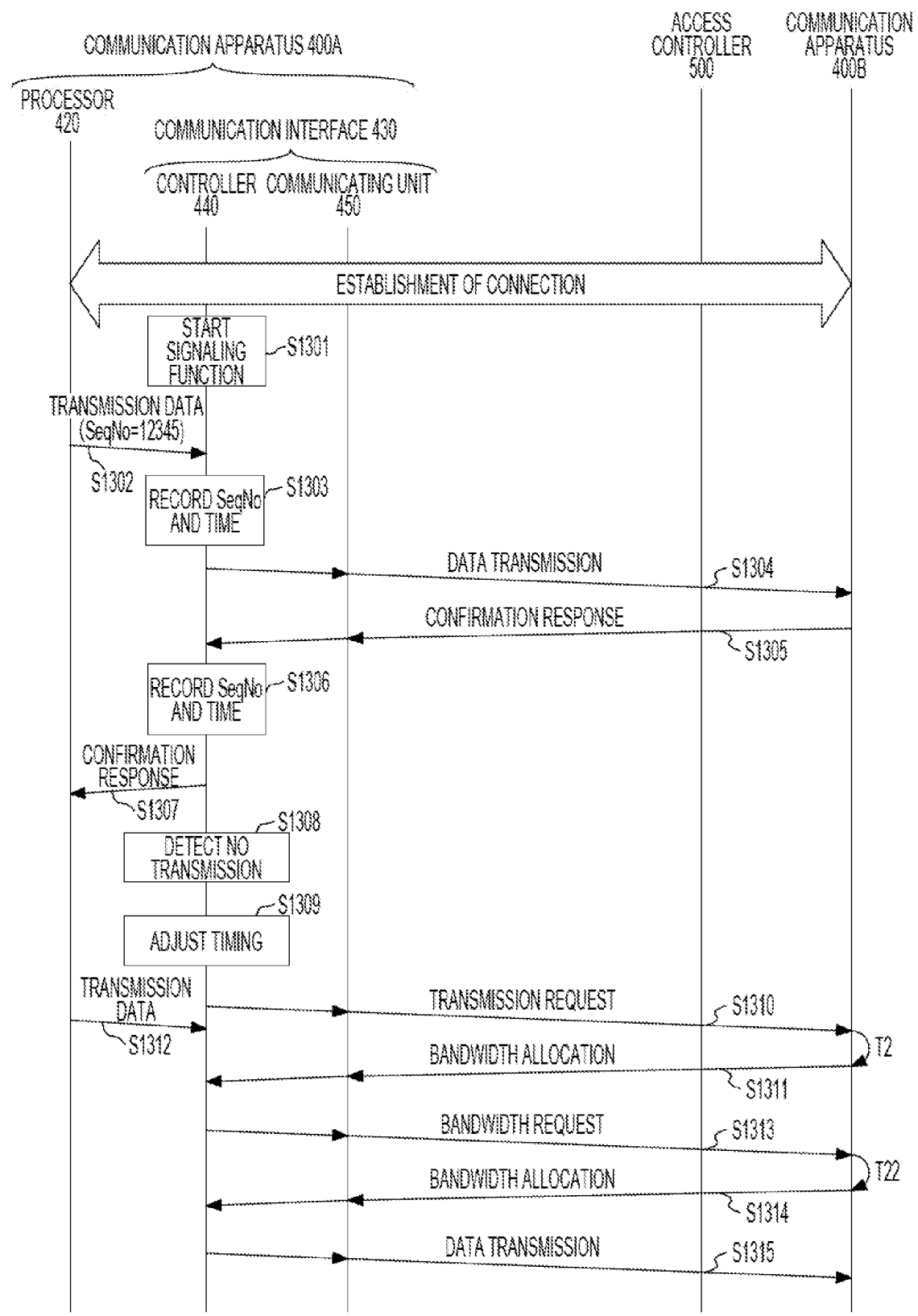
FIG. 13 illustrates an example of a signaling procedure according to a seventh embodiment, which is performed between a communication apparatus and an access controller.

FIG. 13 illustrates an example of a signaling procedure according to a seventh embodiment, which is performed between the communication apparatuses 400 and the access controller 500. S1301 and S1310 to S1315 illustrated in FIG. 13 are similar to S1208, S1210 to S1213, S1217, and S1218 illustrated in FIG. 12. The sequence illustrated in FIG. 13 is different from that in FIG. 12 in that the controller 440 measures a response time using packets transmitted and received according to an upper layer protocol. For example, the controller 440 monitors the sequence number of a packet transmitted by the transmitter 407 (at S1303) to measure the response time (at S1308).

For example, in a case where the upper layer protocol is TCP, the controller 440 detects a sequence number from the TCP header of a packet sent from the transmitter 407. The controller 440 detects the sequence number (SeqNo) included in a packet transmitted from the transmitter 407 and a received packet (at S1303).

In the example illustrated in FIG. 13, the controller 440 measures a third response time from when a packet having sequence number "12345" is transmitted from the transmitter 407 to when a confirmation response packet including this sequence number is received. The controller 440 records the sequence number of the packet transmitted from the transmitter 407 and the time of transmission (at S1303), and also records the sequence number included in an Ack packet and the time of receipt (at S1306).

The controller 440 calculates a packet round trip delay time or round trip time (RTT) using the difference between the time of transmission of the transmission sequence number and the time of receipt of the confirmation response packet in response thereto to determine a third response time. In accordance with the determined third response time, the controller 440 determines the timing (at S1309) at which a transmission request is to be transmitted (at S1310) to the access controller 500 when no transmission data is obtained.

In protocols that involve sending a confirmation response, such as TCP, there is a tendency for data transmission and reception to occur at intervals of RTT. Thus, the absence of subsequent transmission data after the interruption of transmission data may often continue for a period until an interval of RTT has elapsed since the last similar situation. In terms of this feature, the above timing is determined by detecting the "no transmission" state where transmission data is absent (at S1308) and selecting (at S1309) a timing that is a period of time corresponding to the time T3 illustrated in FIG. 7 according to the first embodiment before the time obtained by adding the RTT to the time at which the transmission of new transmission data occurs after the last interruption of transmission data. In actual implementations, the timing may be shifted with respect to the same timing as an interval of RTT due to other environmental factors or implementation factors. Thus, the controller 440 may add an amount of adjustment to the selected timing to select an optimum timing.

Eighth Embodiment

The example configuration of the communication system illustrated in FIG. 4 and the example configuration of the communication apparatus 400 illustrated in FIG. 5 are also applied to an eighth embodiment.

Figure 14:
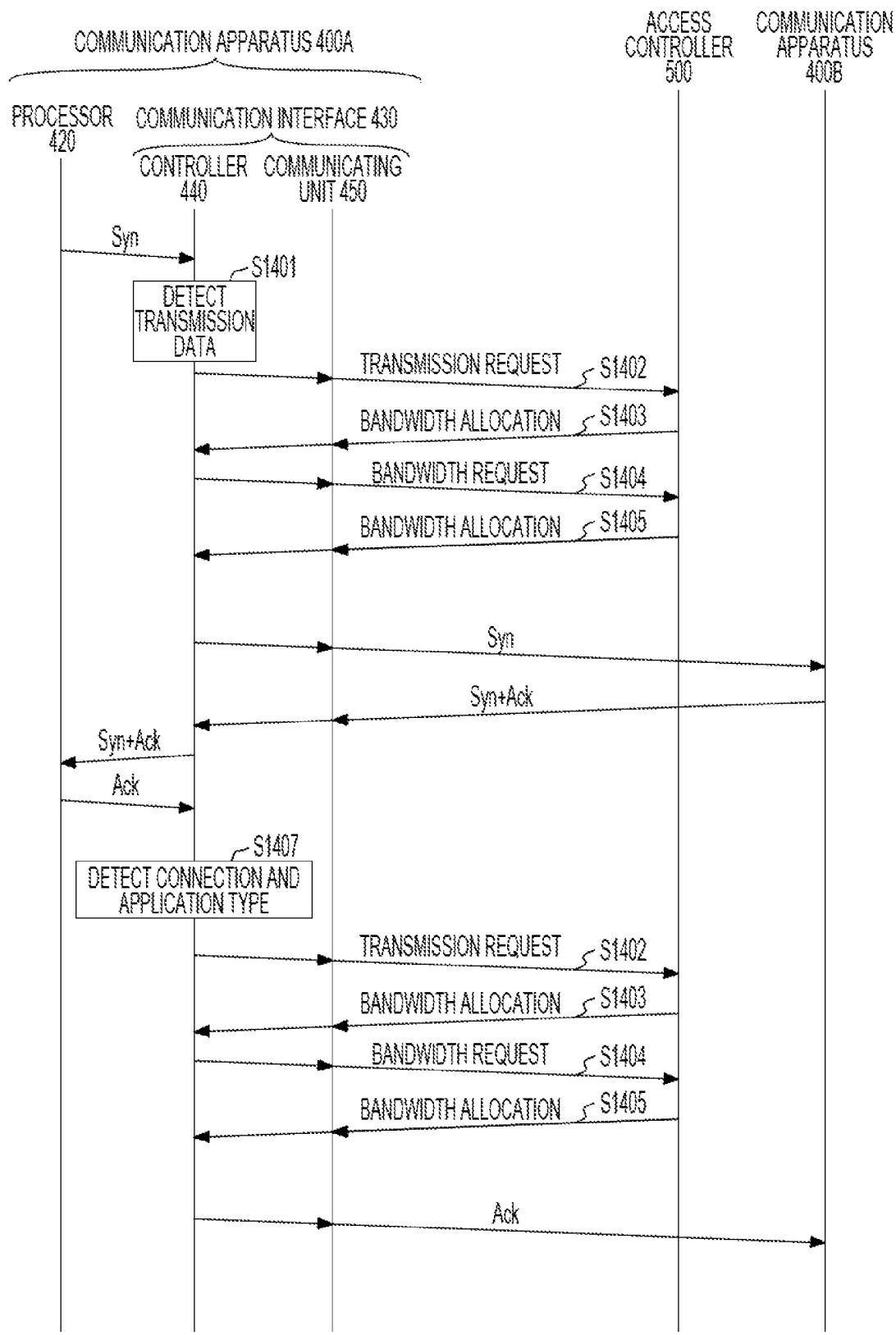
FIG. 14 illustrates an example of a signaling procedure according to an eighth embodiment, which is performed between a communication apparatus and an access controller.

FIG. 14 illustrates an example of a signaling procedure according to the eighth embodiment, which is performed between the communication apparatuses 400 and the access controller 500. S1401 to S1405 illustrated in FIG. 14 are similar to S601 to S605 illustrated in FIG. 6, respectively. The sequence illustrated in FIG. 14 is different from that in FIG. 6 in that the controller 440 detects the application type in addition to the establishment of a connection.

The controller 440 detects the establishment of a connection and the application type (at S1407).

In accordance with the detected application type, the controller 440 determines whether or not to transmit a transmission request before data generated by executing the application 401 is received by the processor 420.

For example, when TCP is used as the upper layer protocol, the controller 440 detects the port number in the TCP header to determine the application type.

FIG. 15 illustrates examples of the application type and the port number. The controller 440 detects the value set in the "destination port" item included in the TCP header of a packet to be transmitted. For example, the controller 440 checks the TCP header of a packet in which a SYN flag is set to estimate the type of the application 401 to be used before the establishment of a connection.

In the example in the first row illustrated in FIG. 15, the type of the application 401 is the Hypertext Transfer Protocol (HTTP), and the "destination port" item is set to 80. When HTTP is employed, it is estimated that the application 401 generates a connection that is lost for a short period of time. Therefore, when a connection with destination port "80" is detected, the controller 440 does not send a transmission request under the absence of transmission data, which has been described with respect to the first to sixth embodiments, even though a TCP connection has been detected, and starts signaling with the access controller 500 after transmission data has been received from the processor 420.

This may suppress unnecessary consumption of network resources, which may be caused by executing a signaling sequence for sending a bandwidth request in advance under the absence of subsequent transmission data.

In the example in the second row illustrated in FIG. 15, the type of the application 401 is TELNET, and the "destination port" is set to 23. When TELNET is employed, it is estimated that the application 401 occasionally generates data with respect to an established connection. Therefore, when a connection with destination port "23" is detected, the controller 440 starts signaling with the access controller 500 after transmission data generated by executing the application 401 has been received from the processor 420.

In the example in the third row illustrated in FIG. 15, the type of the application 401 is the File Transfer Protocol (FTP) for data transfer, and the source port number is set to 20. When FTP for data transfer is employed, it is estimated that the processor 420 steadily generates data by executing the application 401. Therefore, when a connection with source port number "20" is detected, the controller 440 starts signaling with the access controller 500 before transmission data generated by executing the application 401 has been received from the processor 420.

Therefore, when the processor 420 generates transmission data with intervals, the situation where the controller 440 has no transmission data although it receives bandwidth allocation may be obviated. This may avoid consumption of network resources, which may be caused by making such an unnecessary bandwidth request. Furthermore, when the processor 420 successively generates transmission data, signaling is started prior to the generation of data, thereby reducing the delay time from when the controller 440 receives transmission data to when the transmission data is transmitted.

Ninth Embodiment

The example configuration of the communication system illustrated in FIG. 4 and the example configuration of the communication apparatus 400 illustrated in FIG. 5 are also applied to a ninth embodiment.

In the ninth embodiment, the controller 440 illustrated in FIG. 5 further monitors bandwidth allocation performed by the access controller 500.

When an available bandwidth is detected, the controller 440 transmits a bandwidth request even if the processor 420 has not received transmission data generated by executing the application 401 or the like. When no available bandwidth is detected, the controller 440 executes signaling for making a bandwidth request after the processor 420 has received transmission data generated by executing the application 401 or the like.

Therefore, the controller 440 may suppress transmission of data when the network load is high and otherwise, may perform signaling in advance for transmitting data. This results in efficient use of network resources. When there is room in the network, the delay time from when the controller 440 receives transmission data to when the transmission data is transmitted may be reduced.

Figure 16:
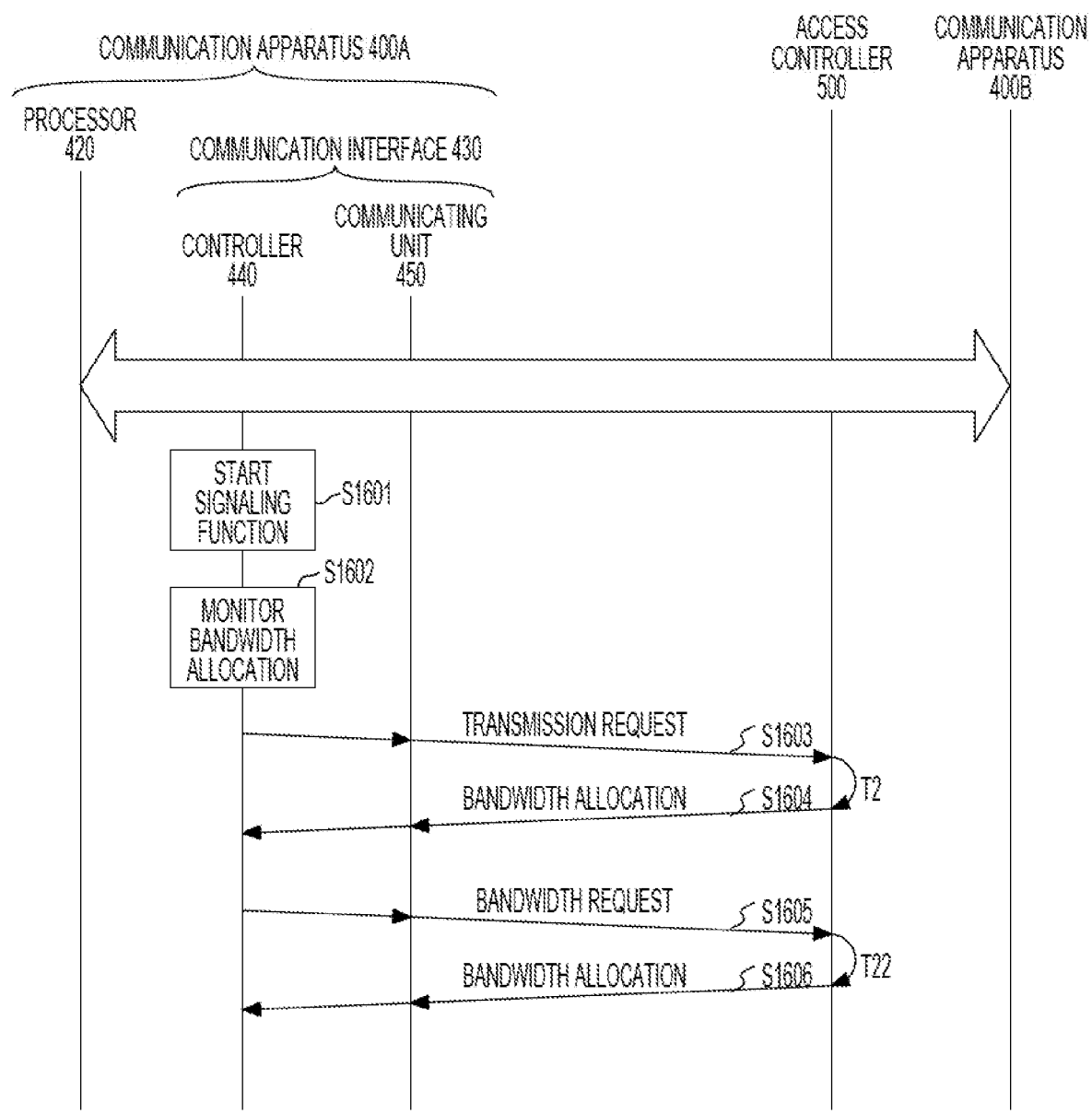
FIG. 16 illustrates an example of a signaling procedure according to a ninth embodiment, which is performed between communication apparatuses and an access controller.

FIG. 16 illustrates an example of a signaling procedure according to the ninth embodiment, which is performed between the communication apparatuses 400 and the access controller 500. The sequence illustrated in FIG. 16 is different from that in FIG. 7 in that the controller 440 further monitors bandwidth allocation performed by the access controller 500. For ease of understanding of the embodiment, the procedure for the processor 420 to transmit data generated by executing the application 401 or the like is omitted.

The controller 440 starts the signaling function (step S1601) after the establishment of a connection has been detected using the connection detecting function. The controller 440 monitors bandwidth allocation performed by the access controller 500 to determine the amount of bandwidth allocated to the communication apparatuses participating in the network, such as the communication apparatuses 400A and 400B.

Figure 17:
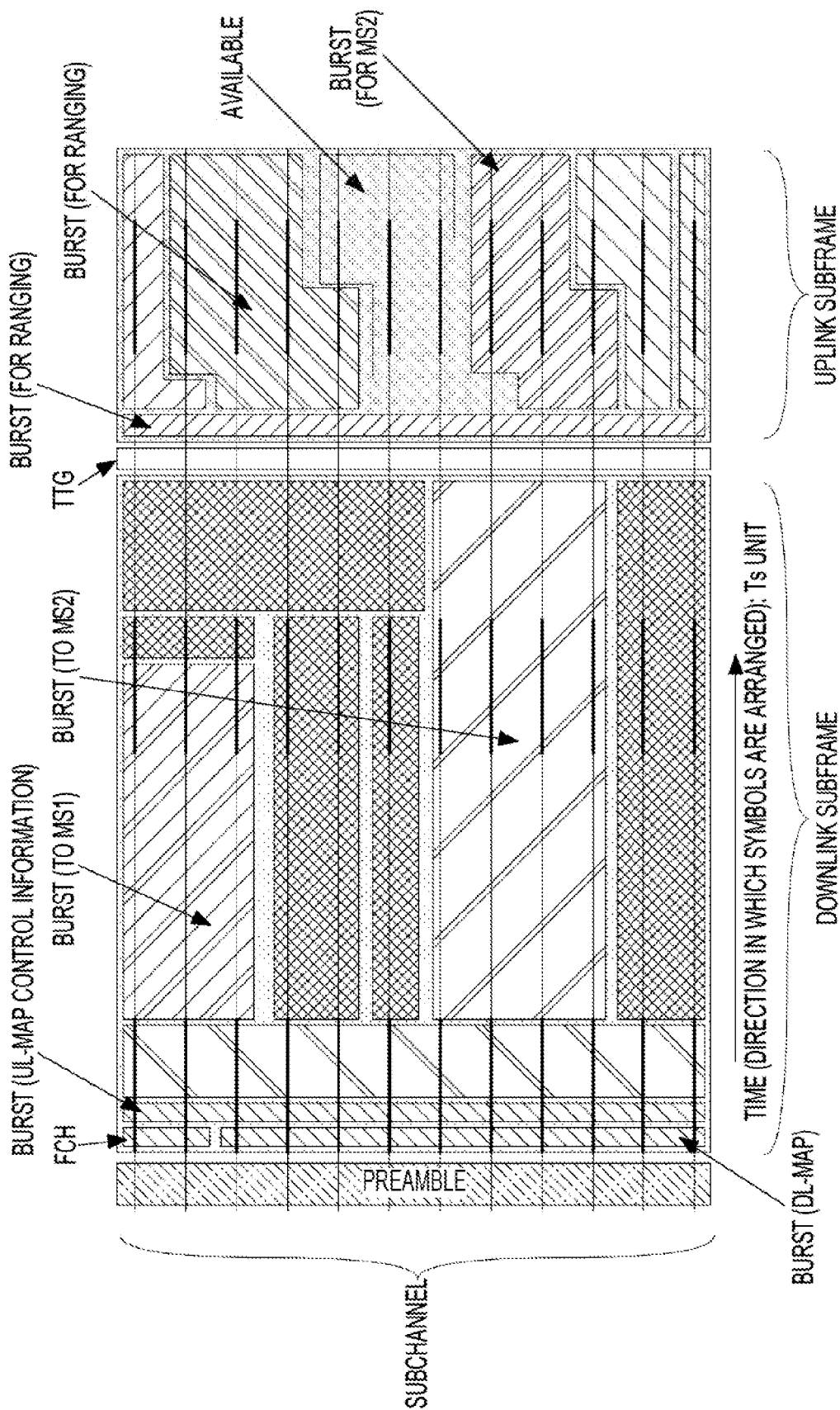
FIG. 17 illustrates the configuration of an OFDMA frame.

A method for monitoring bandwidth allocation performed by the access controller 500 will now be described in the context of a method based on WiMAX, by way example. FIG. 17 illustrates the configuration of an orthogonal frequency division multiplexing access (OFDMA) frame that is used in WiMAX systems. In FIG. 17, the abscissa represents the time axis, which indicates the direction in which OFDMA symbols are arranged, and the ordinate indicates the direction in which subchannels are arranged.

An OFDMA frame has a downlink subframe and an uplink subframe, and is provided with a transmit transition gap (TTG) therebetween. TTG is the guard time required for a base station to switch from transmission to reception.

The downlink subframe includes a preamble, a frame control header (FCH), a downlink map (DL-MAP), an uplink map (UL-MAP), and a plurality of downlink bursts. The preamble includes a preamble symbol pattern that is provided for a mobile station to implement frame synchronization. The FCH includes a method regarding the subchannel used and the DL-MAP positioned immediately after the FCH.

The DL-MAP includes downlink burst mapping information about the downlink subframe. A mobile station receives and analyzes the DL-MAP to identify the UL-MAP and the downlink bursts (to mobile stations MS1 and MS2).

The UL-MAP includes uplink burst mapping information about the uplink subframe. A mobile station receives and analyzes the UL-MAP to identify uplink bursts (for mobile stations MS1 and MS2).

A burst is a block of data to be transferred, which is allocated within a frame.

Figure 18:
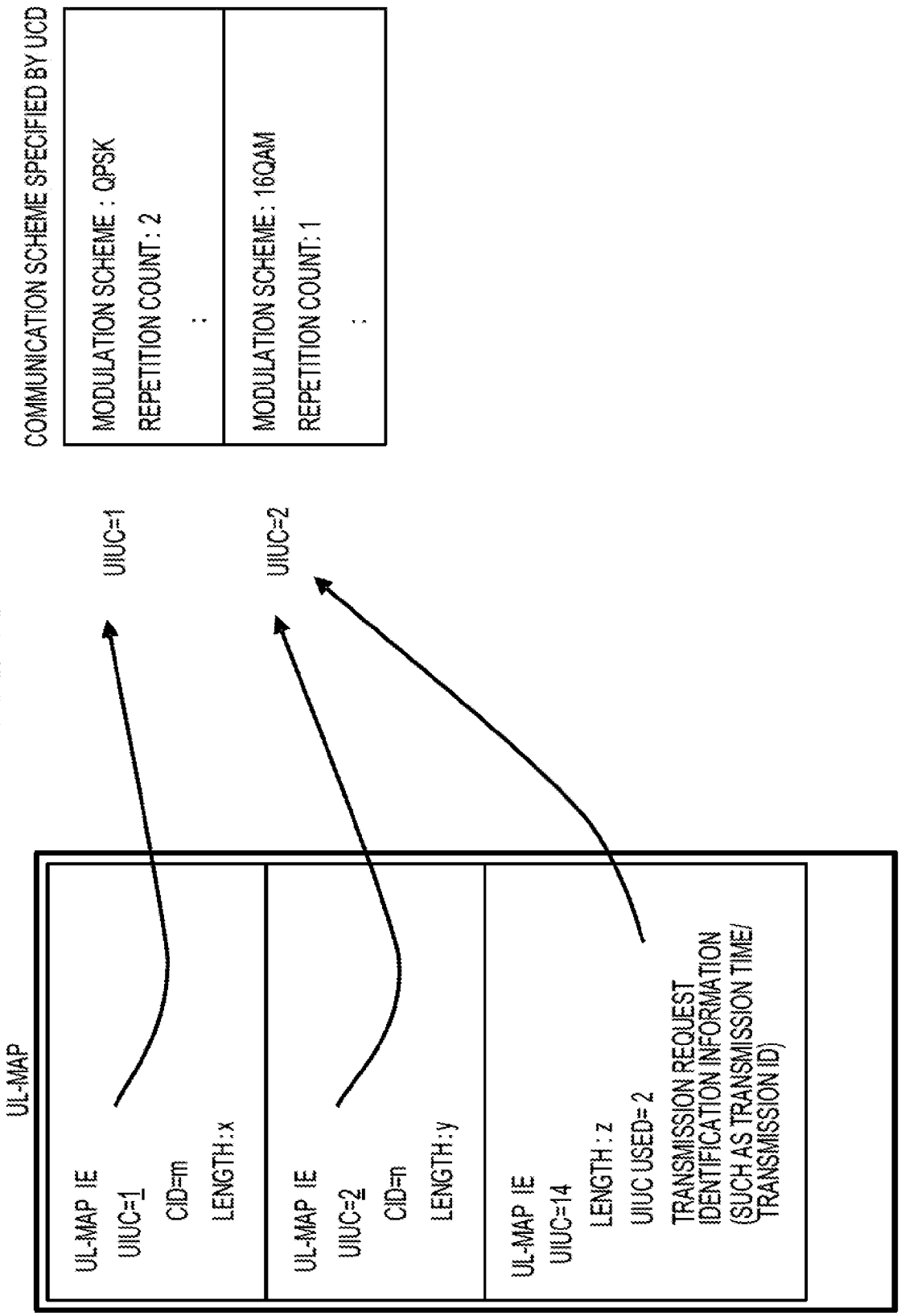
FIG. 18 illustrates an example of the detailed configuration of UL-MAP.

FIG. 18 illustrates an example of the detailed configuration of the UL-MAP. As illustrated in FIG. 18, the UL-MAP includes a plurality of UL-MAP information elements (UL-MAP IEs). Each of the UL-MAP IEs includes an uplink interval usage code (UIUC) serving as a code for specifying an uplink burst.

The UL-MAP IEs in which UIUC=1 to 10 is set carry burst allocation information. The UL-MAP IE in which UIUC=14 is set includes control area allocation information. The control area allocation information carries transmission request identification information indicating which transmission request the bandwidth allocation corresponds to, such as the time of transmission or the transmission ID, and the UIUC number contained in the UL-MAP IE that is actually used in the bandwidth allocation.

In the example illustrated in FIG. 18, the UL-MAP IE in which UIUC=14 is set indicates that the UL-MAP IE in which UIUC=2 is set carries burst allocation.

On the basis of the UIUCs of the UL-MAP IEs which are set to values in the range of 1 to 10, as illustrated in the right portion of FIG. 18, an uplink channel descriptor (UCD) carries the transmission scheme of an individual UIUC. In the example illustrated in FIG. 18, the quadrature phase shift keying (QPSK) modulation scheme is set as the communication scheme for UIUC=1, and a repetition count representing the number of times a symbol is repeated in order to improve communication reliability is set to a value of 2. UCD is a MAC management message (uplink channel descriptor) for specifying the characteristics of the uplink physical layer. Checking each UL-MAP IE allows determination of whether or not there is an available bandwidth in the burst allocation of the uplink subframe.

The controller 440 checks the UL-MAP IEs using the signaling function. When there is an available bandwidth in the burst allocation, the controller 440 causes the transmitter 407 to transmit a transmission request, and starts signaling before the controller 440 receives data from the processor 420. When there is no available bandwidth in the burst allocation, the controller 440 causes the transmitter 407 to transmit a transmission request using the signaling function, and starts signaling after the controller 440 receives data from the processor 420.

The determination of whether there is an available bandwidth in the burst allocation may be performed by simply determining the presence or absence of an available bandwidth or by determining whether or not a larger number of available bandwidths than a predetermined value are present.

Tenth Embodiment

The example configuration of the communication system illustrated in FIG. 4 is also applied to a tenth embodiment.

Figure 19:
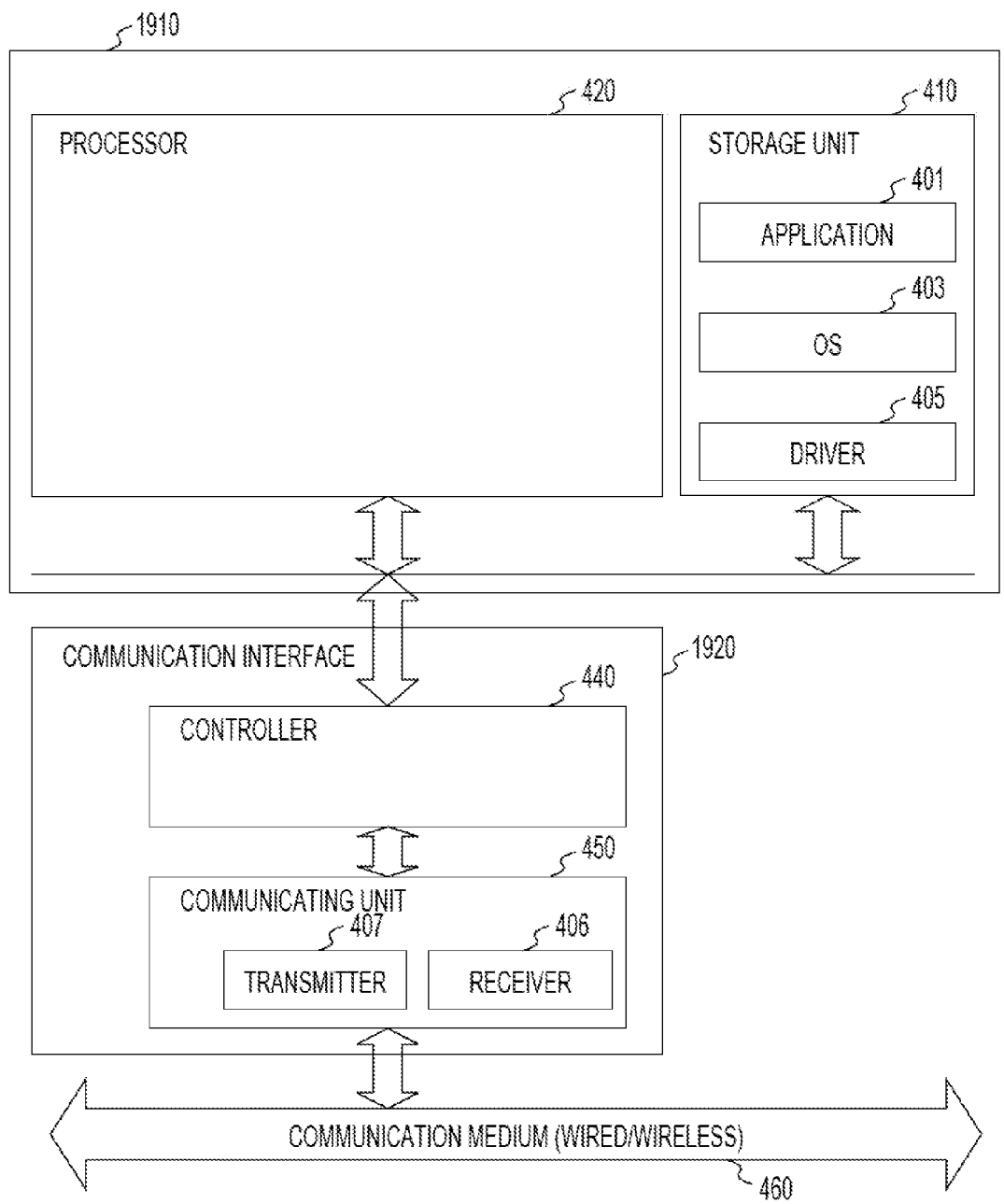
FIG. 19 illustrates an example configuration of an apparatus and a communication interface module according to a tenth embodiment.

FIG. 19 illustrates an example configuration of an apparatus 1910 and a communication interface module 1920 according to the tenth embodiment. The elements illustrated in FIG. 19 are similar to those in FIG. 5, and the difference therebetween is that the apparatus 1910 and the communication interface module 1920 are separately provided.

The communication interface module 1920 includes a communicating unit 450, a receiver 406, a transmitter 407, and a controller 440, each of which is operated in accordance with any of the first to ninth embodiments described above.

Eleventh Embodiment

The example configuration of the communication system illustrated in FIG. 4 is also applied to an eleventh embodiment.

In the eleventh embodiment, a communication method is provided. In the communication method, the communication apparatus 400 illustrated in FIG. 5 or the communication interface module 1920 illustrated in FIG. 19 executes any of the first to tenth embodiments described above.

Transmission control with the use efficiency of network resources taken into account may be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a controller configured to control transmission of a bandwidth request message, the transmission being triggered by a detection of a connection establishment between the communication apparatus and a destination apparatus in a layer that is higher than a media-access control layer; and
a transmitter configured to transmit the bandwidth request message in accordance with a control of the controller, wherein
the controller controls the transmitter to transmit data that reaches the controller after the connection establishment, using a bandwidth allocated in accordance with the transmitted bandwidth request message, and
when a bandwidth required to transmit the data is not set before the bandwidth request message is transmitted, the controller makes a request for a predetermined amount of bandwidth using the bandwidth request message, and when the bandwidth required to transmit the data is set before the bandwidth request message is transmitted, the controller makes a request for the required bandwidth using the bandwidth request message.

2. The communication apparatus according to claim 1, wherein when the bandwidth required to transmit the data is set before the bandwidth request message is transmitted, the controller makes a request for a total bandwidth including the bandwidth required to transmit the data and a bandwidth required to newly transmit the bandwidth request message using the bandwidth request message.

3. The communication apparatus according to claim 1, wherein when the bandwidth required to transmit the data is not set until a bandwidth is allocated in accordance with the transmitted bandwidth request message, the controller transmits the bandwidth request message using the allocated bandwidth to make a request for a bandwidth required to transmit a subsequent bandwidth request message.

4. The communication apparatus according to claim 1, wherein the controller monitors bandwidth allocation, the bandwidth allocation being performed by an access controller configured to control access to a network from a plurality of communication apparatuses, and
when an available bandwidth is detected, the controller transmits the bandwidth request message before a bandwidth required to transmit the data is set.

5. The communication apparatus according to claim 1, further comprising:
a communication interface module that includes the controller and the transmitter; and
a processor configured to send the data to the communication interface module for the transmitter therein to transmit the data to the destination apparatus.

6. A communication interface module comprising:
a controller configured to control transmission of a bandwidth request message, the transmission being triggered by a detection of a connection establishment between the communication apparatus and a destination apparatus in a layer that is higher than a media-access control layer; and
a transmitter configured to transmit the bandwidth request message in accordance with a control of the controller, wherein
the controller controls the transmitter to transmit data that reaches the controller after the connection establishment, using a bandwidth allocated in accordance with the transmitted bandwidth request message, and
when a bandwidth required to transmit the data is not set before the bandwidth request message is transmitted, the controller makes a request for a predetermined amount of bandwidth using the bandwidth request message, and when the bandwidth required to transmit the data is set before the bandwidth request message is transmitted, the controller makes a request for the required bandwidth using the bandwidth request message.

7. A communication method comprising:
controlling transmission of a bandwidth request message, the transmission being triggered by a detection of a connection establishment between a communication apparatus and a destination apparatus in a layer that is higher than a media-access control layer;
transmitting the bandwidth request message; and
transmitting data after the connection establishment, using a bandwidth allocated in accordance with the transmitted bandwidth request message, wherein when a bandwidth required to transmit the data is not set before the bandwidth request message is transmitted, transmitting the bandwidth request message that includes a request for a predetermined amount of bandwidth; and when the bandwidth required to transmit the data is set before the bandwidth request message is transmitted, transmitting the bandwidth request message that includes a request for the required bandwidth.

* * * * *